(12) United States Patent
Sasaki

(10) Patent No.: US 7,034,868 B2
(45) Date of Patent: Apr. 25, 2006

(54) IMAGE PROCESSING CIRCUIT

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 824 days.

(21) Appl. No.: 09/985,373

(22) Filed: Nov. 2, 2001

(65) Prior Publication Data
US 2002/0054229 A1    May 9, 2002

(30) Foreign Application Priority Data
Nov. 6, 2000 (JP) ............................. 2000-337676

(51) Int. Cl.
*H04N 5/228* (2006.01)
*H04N 5/335* (2006.01)
*H04N 5/235* (2006.01)

(52) U.S. Cl. ................. 348/222.1; 348/305; 348/230.1

(58) Field of Classification Search ................ 348/302, 348/305, 222.1, 231.99, 571, 312, 317, 322, 348/321, 231.1, 230.1; 386/117
See application file for complete search history.

(56) References Cited

U.S. PATENT DOCUMENTS

| | | | | |
|---|---|---|---|---|
| 4,710,801 A * | 12/1987 | Kunzinger | .................. | 348/639 |
| 5,444,483 A * | 8/1995 | Maeda | .................... | 348/231.6 |
| 5,581,298 A * | 12/1996 | Sasaki et al. | ............ | 348/222.1 |
| 5,734,424 A * | 3/1998 | Sasaki | ................... | 348/222.1 |
| 5,739,867 A * | 4/1998 | Eglit | .......................... | 348/581 |
| 5,920,343 A * | 7/1999 | Watanabe et al. | ........ | 348/222.1 |
| 6,266,101 B1 * | 7/2001 | Suto | .......................... | 348/663 |
| 6,377,301 B1 | 4/2002 | Hieda | | |
| 6,480,230 B1 * | 11/2002 | Honma | ........................ | 348/443 |
| 6,493,025 B1 * | 12/2002 | Kiriyama et al. | ........ | 348/207.1 |
| 6,628,328 B1 | 9/2003 | Yokouchi et al. | | |
| 6,762,792 B1 * | 7/2004 | Matsumura | .............. | 348/240.2 |
| 6,961,085 B1 * | 11/2005 | Sasaki | ..................... | 348/222.1 |
| 2004/0085462 A1 * | 5/2004 | Sasaki | ..................... | 348/231.6 |

FOREIGN PATENT DOCUMENTS

| | | |
|---|---|---|
| JP | 10-191172 | 7/1998 |
| JP | 11-112882 | 4/1999 |
| JP | 2000-236473 | 8/2000 |

OTHER PUBLICATIONS

U.S. Appl. No. 09/985,373, filed Nov. 2, 2001, Sasaki.
U.S. Appl. No. 10/694,914, filed Oct. 29, 2003, Sasaki.

(Continued)

*Primary Examiner*—Lin Ye
(74) *Attorney, Agent, or Firm*—Oblon, Spivak, McClelland, Maier & Neustadt, P.C.

(57) ABSTRACT

A pixel clock is switched to a high speed for reading culled pixel data from a CCD or switched to a low speed for reading all pixels from the CCD when picking up an image of an object, so that a main memory stores a first field initially read from the CCD and an RPU reads the first field from the main memory in synchronization with reading of a subsequent second field for executing a series of image processing in real time. The main memory stores the processed data. A CPU reads the processed data from the main memory, compresses the processed data and thereafter stores the same in a storage medium. Thus provided is an image processing circuit capable of increasing a frame rate for finder display and efficiently executing image processing at a high speed.

2 Claims, 22 Drawing Sheets

OTHER PUBLICATIONS

U.S. Appl. No. 10/694,913, filed Oct. 29, 2003, Sasaki.
U.S. Appl. No. 10/694,909, filed Oct. 29, 2003, Sasaki.
U.S. Appl. No. 09/459,574, filed Dec. 13, 1999, Pending.
U.S. Appl. No. 09/504,082, filed Feb. 15, 2000, Pending.
U.S. Appl. No. 09/964,458, filed Sep. 28, 2001, Pending.
U.S. Appl. No. 09/985,373, filed Nov. 2, 2001, Pending.

* cited by examiner

FIG. 9

|   |   |   |   |   |   |   |
|---|---|---|---|---|---|---|
| R | G | R | G | R | G | R |
| G | B | G | B | G | B | G |
| R | G | R | G | R | G | R |
| G | B | G | B | G | B | G |
| R | G | R | G | R | G | R |
| G | B | G | B | G | B | G |
| R | G | R | G | R | G | R |

33a — top-left 2x2 block; 33 — array

FIG. 10

|   |     |     |     |     |     |   |
|---|-----|-----|-----|-----|-----|---|
|   | P00 | P01 | P02 | P03 | P04 |   |
|   | P10 | P11 | P12 | P13 | P14 |   |
|   | P20 | P21 | P22 | P23 | P24 |   |
|   | P30 | P31 | P32 | P33 | P34 |   |
|   | P40 | P41 | P42 | P43 | P44 |   |

41A → row P00–P04
41B → row P10–P14
41C → row P20–P24
41D → row P30–P34
41E → row P40–P44

IN FINDER OPERATION
CYCLE (T) FOR READING PIXEL TRANSFER CLOCK

IN ALL PIXEL READING OPERATION

1/2 CYCLE (T/2) FOR READING PIXEL TRANSFER CLOCK

1/2 CYCLE (T/2) FOR READING PIXEL TRANSFER CLOCK

IN FINDER OPERATION
  CYCLE (T) FOR READING PIXEL TRANSFER CLOCK

IN ALL PIXEL READING OPERATION
  CYCLE (T) FOR READING PIXEL TRANSFER CLOCK

F I G . 16
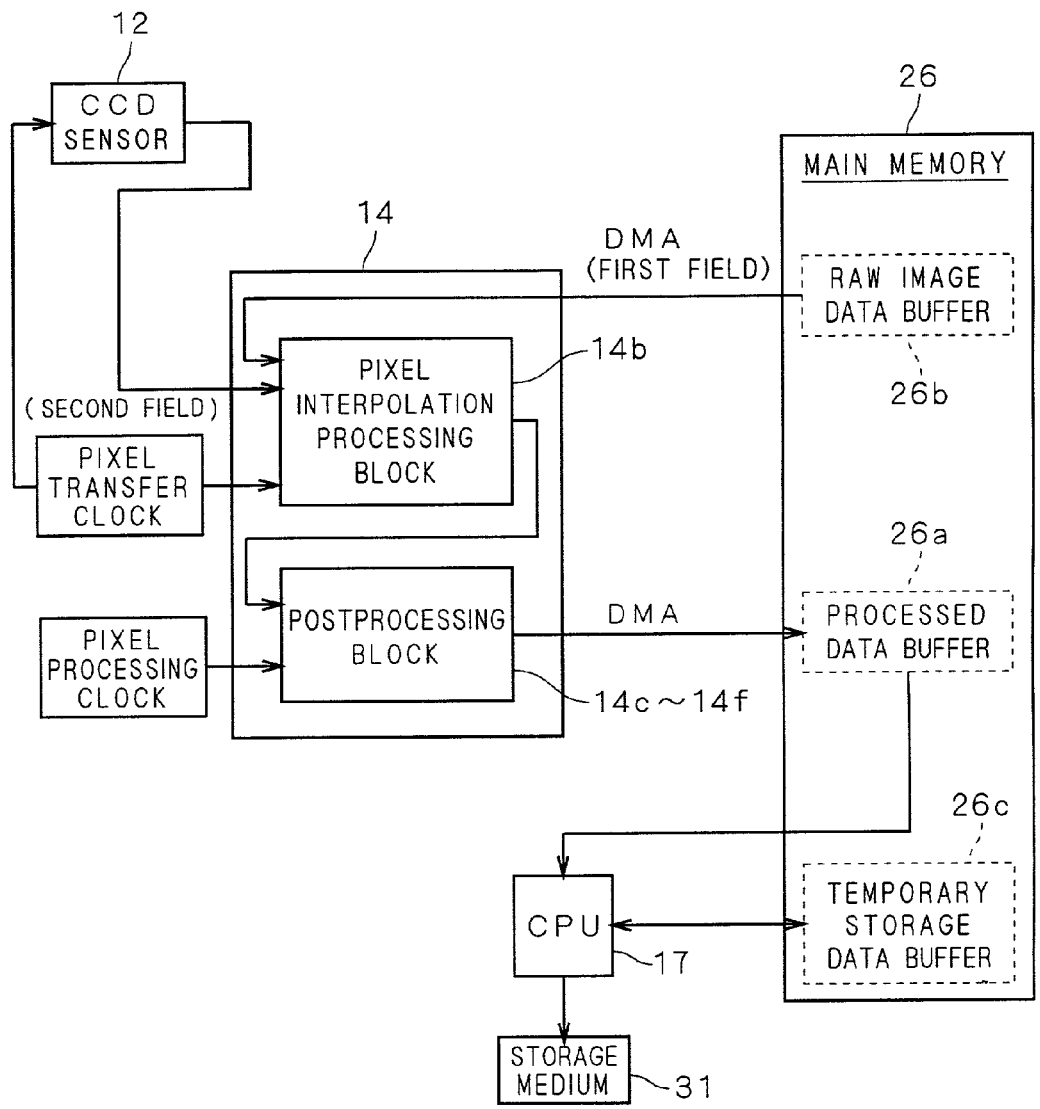

F I G . 18
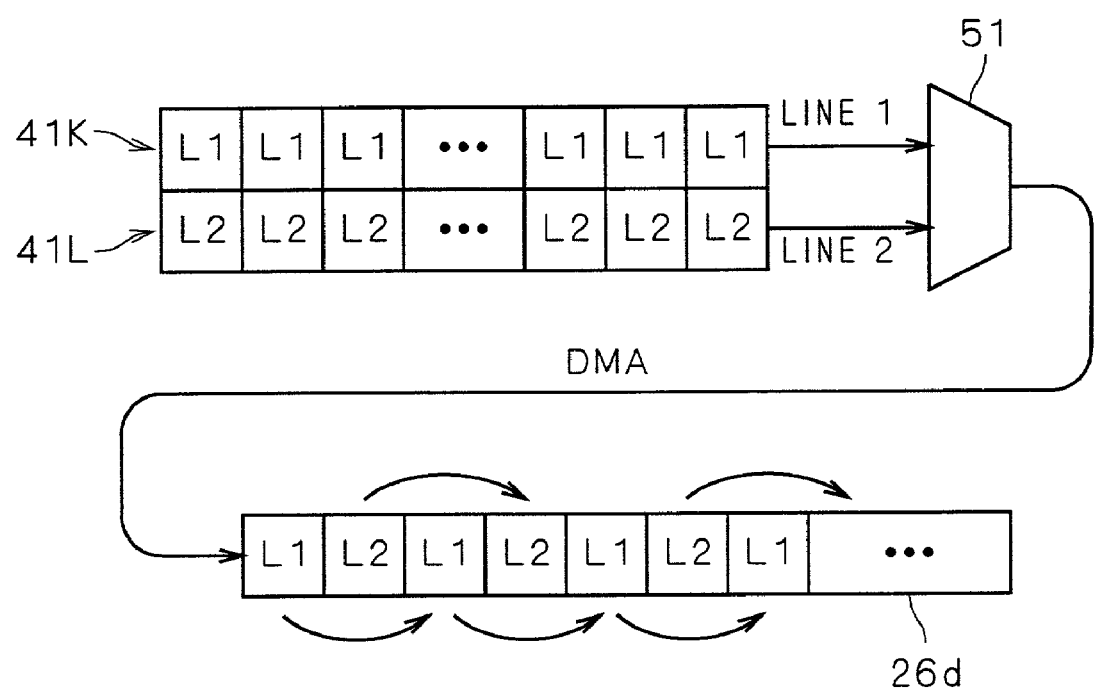

IMAGE PROCESSING CIRCUIT

BACKGROUND OF THE INVENTION

1. Field of the Invention

The present invention relates to an image processing circuit for image data picked up with a digital pickup device such as a digital still camera.

2. Description of the Background Art

FIG. 26 schematically illustrates the structure of a general digital still camera 100. As shown in FIG. 26, an image signal picked up with an image pickup device 105 such as a loaded CCD or CMOS sensor is A/D converted to a digital image signal and thereafter captured by an image processing part 106, to be subjected to various image processing such as pixel interpolation, color space conversion and edge enhancement. The image data subjected to the image processing is displayed on a finder of a liquid crystal monitor 109 or the like. In general, the image pickup device 105 is driven in either an interlacing system of reading image signals from an odd field consisting of only odd lines forming all pixels and an even field consisting of only even lines at temporally different timings or a progressive system of sequentially reading image signals from respective lines. Referring to FIG. 26, numeral 101 denotes an optical lens, numeral 102 denotes a color correction filter, numeral 103 denotes an optical LPF (low-pass filter), numeral 104 denotes a color filter array, numeral 107 denotes a driving part driving/controlling the image pickup device 105 etc., and numeral 111 denotes an external interface connected to an external device.

Operations of the digital still camera 100 are as follows: First, the liquid crystal monitor 109 visually displays image signals slightly reduced in resolution by culling a plurality of prescribed lines from all pixels of the image pickup device 105 and subjected to image processing in the aforementioned image processing part 106 to the operator of the digital still camera 100 through the finder (finder operation).

The operator presses an image pickup button while confirming the image of an object through the liquid crystal monitor 109, so that pixel data are read from all lines of the image pickup device 105 in the interlacing system or the progressive system (all pixel reading operation). The pixel data are A/D converted, subjected to image processing by the image processing part 106, thereafter subjected to JPEG compression or the like and stored in a storage medium such as a built-in memory 108 or a memory card 110. Referring to FIG. 27, pixel data (CCD data) of a first field defined by either an odd field or an even field and subsequently read pixel data of a second field defined by the remaining field are read from the image pickup device 105 driven in the interlacing system, A/D converted and thereafter temporarily stored in a raw image data buffer 108a provided in the built-in memory 108 (step 100). Then, a real-time processing unit (hereinafter abbreviated as an RPU) 120 formed by hardware sequentially reads the pixel data of the first and second fields stored in the raw image data buffer 108a, executes image processing such as pixel interpolation, color space conversion and edge enhancement in real time and outputs the processed data to a processed data buffer 108b, which in turn stores the processed data (step 101). Then, a CPU (central processing unit) 121 reads the processed data from the processed data buffer 108b, performs JEPG (joint photographic experts group) compression or the like by software with a temporary storage data buffer 108c and thereafter stores the processed data in a storage medium 122 such as the aforementioned memory card 110 (step 102).

When the image pickup device 105 is driven in the progressive system, the processing of the aforementioned steps 101 and 102 can be executed by directly outputting the CCD data to the RPU 120 without temporarily storing the same in the raw image data buffer 108a.

In general, however, the frequency of a driving clock for the image pickup device 105 is suppressed to a constant value within a range not exceeding the maximum value of the driving clock frequency for the RPU 120, to disadvantageously result in a small frame rate for finder display. In other words, a small load is applied to the RPU 120 in the aforementioned finder operation since the image pickup device 105 outputs culled CCD data of low resolution, while the load applied to the RPU 120 is increased to at least twice in the aforementioned all pixel reading operation since the image pickup device 105 outputs CCD data of high resolution from all lines. However, the driving clock frequency for the image pickup device 105 is suppressed to the constant value within the range not exceeding the maximum driving clock frequency allowed for the RPU 120 throughout the periods of the all pixel reading operation and the finder operation, and hence the frame rate for finder display is reduced to deteriorate the quality of the visual image displayed on the finder.

SUMMARY OF THE INVENTION

According to a first aspect of the present invention, an image processing circuit comprises an image pickup sensor selectively switched to any of a plurality of systems including a culling progressive system of culling prescribed lines among lines forming a photosensitive part for sequentially reading image signals and an interlacing system of reading image signals from an odd field consisting of only odd lines included in the lines and an even field consisting of only even lines at temporally different timings and an image processing part processing image signals read from the image pickup sensor in real time, while the frequency of a pixel transfer clock for driving the image pickup sensor in the cull progressive system is set to a value higher than the frequency of the pixel transfer clock for driving the image pickup sensor in the interlacing system.

In the image processing circuit according to the first aspect, a small load is applied to the image processing part when the image pickup sensor is driven in the aforementioned culling progressive system since the image pickup sensor outputs image signals of low resolution while the load applied to the image processing part is increased when the image pickup sensor is driven in the aforementioned interlacing system since the image pickup sensor outputs image signals of high resolution. When the image pickup sensor is driven in the aforementioned culling progressive system, therefore, the frequency of the pixel transfer clock is so increased that the image processing part can execute image processing at a high speed for improving the frame rate for finder display.

According to a second aspect of the present invention, the image processing circuit according to the first aspect further comprises a buffer part storing pixel data of a first field defined by either the odd field or the even field when driving the image pickup sensor in the interlacing system, while the image processing part reads pixel data from the first field stored in the buffer part in synchronization with reading of pixel data of a second field defined by the remaining field and simultaneously processes the pixel data of both first and second fields in real time.

In the image processing circuit according to the second aspect, real-time image processing on the aforementioned first and second fields can be efficiently ended immediately when reading from the second field is ended. Therefore, a picked-up image can be displayed on a finder substantially with no delay in time or image data thereof can be quickly stored in a storage medium such as a semiconductor memory, for example.

According to a third aspect of the present invention, the image processing part has a pixel interpolation unit interpolating pixel data, for applying the pixel interpolation unit to respective pixel data of a plurality of the lines in time sharing every reading cycle of the pixel transfer clock.

In the image processing circuit according to the third aspect, the aforementioned pixel interpolation unit is time-shared when the image processing part has a sufficiently high operating speed, so that the circuit structure can be reduced for reducing the power and the cost required for the circuit. When the second and third aspects of the present invention are combined with each other, the pixel data of the first field stored in the aforementioned buffer part and the pixel data of the second field, synchronously input in the image processing part every reading cycle for the aforementioned pixel transfer clock, can be collectively subjected to pixel interpolation every reading cycle.

The present invention is also directed to an image processing circuit. According to a fourth aspect of the present invention, an image processing circuit comprises an image pickup sensor driven in an interlacing system of reading image signals from an odd field consisting of only odd lines included in lines forming a photosensitive part and an even field consisting of only even lines at temporally different timings, a buffer part storing pixel data of a first field defined by either the odd field or the even field and an image processing part reading pixel data from the first field stored in the buffer part in synchronization with reading of pixel data of a second field defined by the remaining field and simultaneously processing the pixel data of both first and second fields in real time, while the image processing part has a pixel interpolation unit interpolating pixel data, for applying the pixel interpolation unit with respect to pixel data of a plurality of lines in time sharing every line every reading cycle of a pixel transfer clock for driving the image pickup sensor.

In the image processing circuit according to the fourth aspect, the pixel data of the first and second fields synchronously input in the image processing part every reading cycle for the aforementioned pixel transfer clock can be collectively subjected to pixel interpolation every reading cycle. When the image processing part has a sufficiently high operating speed, further, the aforementioned pixel interpolation unit is so time-shared that the circuit structure can be reduced for reducing the power and the cost required for the circuit.

According to a fifth aspect of the present invention, an image processing circuit comprises an image pickup sensor driven in an interlacing system of reading image signals from an odd field consisting of only odd lines included in lines forming a photosensitive part and an even field consisting of only even lines at temporally different timings, a buffer part storing pixel data of a first field defined by either the odd field or the even field and an image processing part reading pixel data from the first field stored in the buffer part in synchronization with reading of pixel data of a second field defined by the remaining field and simultaneously processing the pixel data of both first and second fields in real time, while the image processing part has a plurality of pixel interpolation units interpolating pixel data, for applying each pixel interpolation unit with respect to pixel data of a plurality of lines every line every reading cycle of a pixel transfer clock driving the image pickup sensor.

In the image processing circuit according to the fifth aspect, the pixel data of the first and second fields synchronously input in the image processing part every reading cycle for the aforementioned pixel transfer clock can be collectively subjected to pixel interpolation every reading cycle. Further, pixel interpolation can be executed at a high speed by driving the plurality of pixel interpolation units in parallel with each other.

According to a sixth aspect of the present invention, an image processing circuit comprises an image pickup sensor and an image processing part having a pixel interpolation processing part executing real-time pixel interpolation processing on pixel data read from the image pickup sensor and outputting interpolated pixel data of a plurality of lines every cycle of a pixel transfer clock defining the transfer rate for the pixel data and a postprocessing part further executing real-time image processing on the interpolated pixel data, while the frequency of a pixel processing clock defining the processing speed for the pixel data is set to a value of at least twice the frequency of the pixel transfer clock in the postprocessing part.

In the image processing circuit according to the sixth aspect, the processing rate of the aforementioned postprocessing part can be increased beyond the processing rate of the pixel interpolation processing part, whereby the image processing part can execute real-time image processing with high reliability.

According to a seventh aspect of the present invention, the image processing circuit according to the sixth aspect further comprises a multiplexing part multiplexing pixel data of a plurality of lines output from the pixel interpolation processing part every cycle of the pixel transfer clock and outputting the same from a single output line and a buffer part storing the pixel data output from the multiplexing part, while the postprocessing part reads the pixel data stored in the buffer part sequentially along lines for executing image processing.

In the image processing circuit according to the seventh aspect, the aforementioned postprocessing part can sequentially process pixel data rearranged sequentially along lines, whereby the aforementioned image processing part can reliably execute real-time image processing.

According to an eighth aspect of the present invention, the image processing circuit according to the seventh aspect further comprises a DMA (direct memory access) controller controlling direct transfer of pixel data from the pixel interpolation processing part to the buffer part.

In the image processing circuit according to the eighth aspect, the aforementioned pixel interpolation processing part efficiently executes data transfer to the buffer part at a high speed, so that the aforementioned postprocessing part can reliably execute real-time image processing.

According to a ninth aspect of the present invention, the image processing circuit according to the sixth aspect further comprises a buffer part storing pixel data of a plurality of lines output from the pixel interpolation processing part every cycle of the pixel transfer clock and a DMA (direct memory access) controller performing channel control to transfer the pixel data to the buffer part sequentially along lines.

In the image processing circuit according to the ninth aspect, the aforementioned pixel interpolation processing part stores pixel data sequentially along lines due to the channel control of the DMA controller, whereby the aforementioned postprocessing part can read the pixel data and execute image processing sequentially along lines.

According to a tenth aspect of the present invention, the image processing circuit according to the sixth aspect further comprises a first storage part storing pixel data of a plurality of lines output from the pixel interpolation processing part every line and a second storage part storing pixel data output from the pixel interpolation processing part every line while the postprocessing part reads the pixel data stored in the first storage part sequentially along lines, while the first storage part stores pixel data output from the pixel interpolation processing part every line while the postprocessing part reads pixel data stored in the second storage part sequentially along lines.

In the image processing circuit according to the tenth aspect, the pixel data of the plurality of lines output from the aforementioned pixel interpolation processing part can be rearranged sequentially along lines and output to the aforementioned postprocessing part, which in turn can process the pixel data sequentially along lines, whereby real-time image processing can be reliably executed.

According to an eleventh aspect of the present invention, an image processing circuit comprises an image pickup sensor, a pixel interpolation processing part executing real-time pixel interpolation processing on pixel data read from the image pickup sensor and outputting interpolated pixel data of a plurality of lines every cycle of a pixel transfer clock defining a transfer rate for the pixel data, a buffer part storing the interpolated pixel data of the plurality of lines output from the pixel interpolation processing part, a DMA (direct memory access) controller performing channel control to transfer the interpolated pixel data of the plurality of lines output from the pixel interpolation processing part to the buffer part sequentially along lines and a postprocessing part reading the interpolated pixel data stored in the buffer part and further executing image processing.

In the image processing circuit according to the eleventh aspect, the aforementioned pixel interpolation processing part stores pixel data sequentially along lines due to the channel control of the DMA controller, whereby the aforementioned postprocessing part can read the pixel data and execute image processing sequentially along lines.

Accordingly, an object of the present invention is to provide an image processing circuit capable of increasing the frame rate for finder display and efficiently executing image processing at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 illustrates the basic form of a Bayer color filter array; FIG. 10 illustrates exemplary pixel interpolation units in the image processing circuit according to the embodiment 1;

FIG. 16 is a schematic diagram for illustrating pixel interpolation processing according to an embodiment 4 of the present invention;

FIG. 18 is a schematic diagram for illustrating the image signal processing according to the embodiment 5;

DESCRIPTION OF THE PREFERRED EMBODIMENTS

Figure 1:
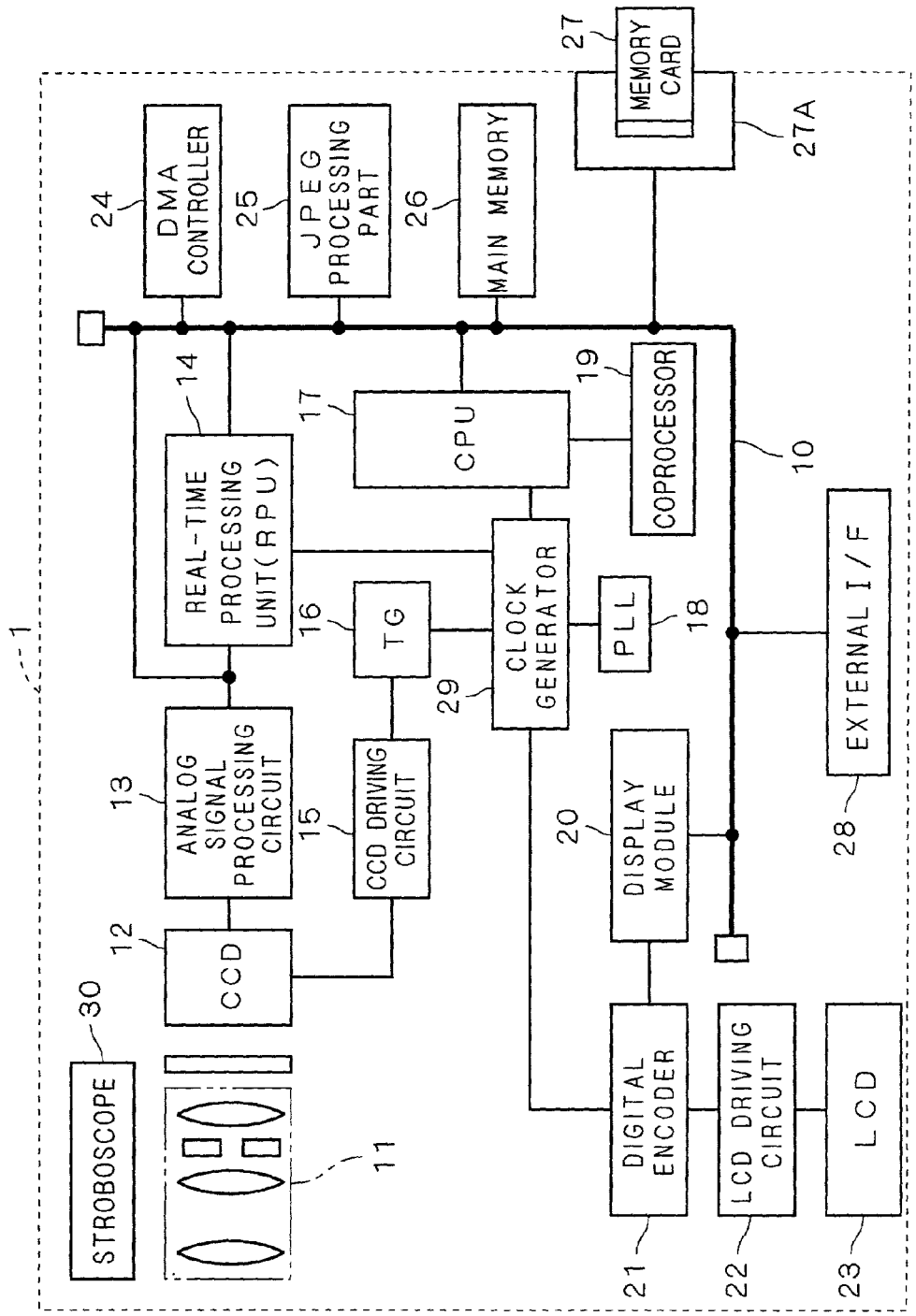
FIG. 1 schematically illustrates the overall structure of a digital still camera according to the present invention.

FIG. 1 is a schematic block diagram showing the overall structure of a digital still camera 1 according to the present invention. This digital still camera 1 comprises an optical mechanism 11 having an AF (auto-focus) function, an automatic diaphragm function etc., so that a CCD (charge-coupled device) sensor 12 picks up an image of an object through this optical mechanism 11. At this time, a stroboscope 30 may apply light synchronized with an image pickup timing and controlled in luminous energy to the object at need. An analog signal processing circuit 13 captures the picked-up image signal of the object and converts the same to a digital image signal. A real-time processing unit (hereinafter abbreviated as an RPU) 14 performs prescribed image processing such as pixel interpolation, color space conversion, edge enhancement and filtering in real time (real-time processing). The image signal subjected to image processing is displayed on an LCD 23 serving as a finder or subjected to software processing such as JPEG compression in a CPU 17 and thereafter transferred to and stored in a memory card 27 through a main bus 10 or output to an external device such as a personal computer through an external interface (I/F) 28. A main memory 26 formed by a DRAM (dynamic random access memory), an SDRAM (synchronous DRAM) or an RDRAM (rambus DRAM) is provided with a buffer area temporarily storing data processed in the RPU 14, a buffer area temporarily utilized for executing software processing in the CPU 17 and the like, as described later in detail.

Referring to FIG. 1, numeral 15 denotes a CCD driving circuit driving the CCD sensor 12, numeral 16 denotes a timing generator regulating operation timings of the RPU 14 and the CCD driving circuit 15, numeral 18 denotes a PLL oscillation circuit, numeral 19 denotes an auxiliary arithmetic unit (coprocessor) for the CPU 17, numeral 20 denotes a display module, numeral 21 denotes a digital encoder and numeral 22 denotes an LCD driving circuit driving the LCD 23. The clock generator 29 divides or multiplies a clock signal supplied from the PLL oscillation circuit 18 thereby generating a driving clock for all modules such as the RPU 14, the timing generator 16, the CPU 17 and the digital encoder 21.

The main memory 26, the external interface 28 and the memory card 27 are interconnected with each other through a main bus 10 along with a DMA (direct memory access) controller 24 and a JPEG processing part 25, and data transfer between these modules can be directly executed through the main bus 10 under control of the DMA controller 24 without through the CPU 17. Thus, the load on the CPU 17 is reduced while a storage area of the main memory 26 can be efficiently utilized.

In a finder operation of displaying the image of the object on the LCD (finder) 23, the CCD driving circuit 15 drives the CCD sensor 12 to output image signals of a plurality of lines after culling prescribed lines in response to the resolution of the finder 23. The CCD data subjected to culling are A/D converted by the analog signal processing circuit 13, subjected to image processing by the RPU 14 and thereafter transferred to the display module 20 and the digital encoder 21 through the main bus 10. The LCD 23 is driven by the LCD driving circuit 22 to display the image data output from the digital encoder 21. Thus, the operator of the digital still camera 1 can adjust the compositional arrangement of the object, proper exposure etc. while confirming the image of the object displayed on the LCD 23.

When the operator presses an image pickup button or the like to issue an image pickup instruction, the processing shifts to an all pixel reading operation so that the CPU 17 cancels the aforementioned finder operation while the clock generator 29 simultaneously changes the driving pulse for the timing generator 16. Then, the CCD driving circuit 15 drives the CCD sensor 12 to output signal charges of all pixels. The image signals read from the CCD sensor 12 are subjected to real-time image processing in the RPU 14 and thereafter compressed as described later, to be stored in a storage medium such as the memory card 27 through a card interface 27A or output to the external device such as a personal computer through the external interface 28.

The aforementioned CCD sensor 12 may be formed by an existing one generally comprising a charge storage part and a charge transfer part therein, which is driven in an interlacing scanning system of reading image signals from an odd field consisting of only odd lines forming a photosensitive part and an even field consisting of only even lines at temporally different timings in the aforementioned all pixel reading operation and driven in a culling progressive system of sequentially reading image signals from a plurality of lines after culling prescribed lines in the aforementioned finder operation. While this embodiment employs the CCD sensor 12 as an image pickup sensor, the present invention is not restricted to this but a CMOS sensor may alternatively be employed.

Figure 2:
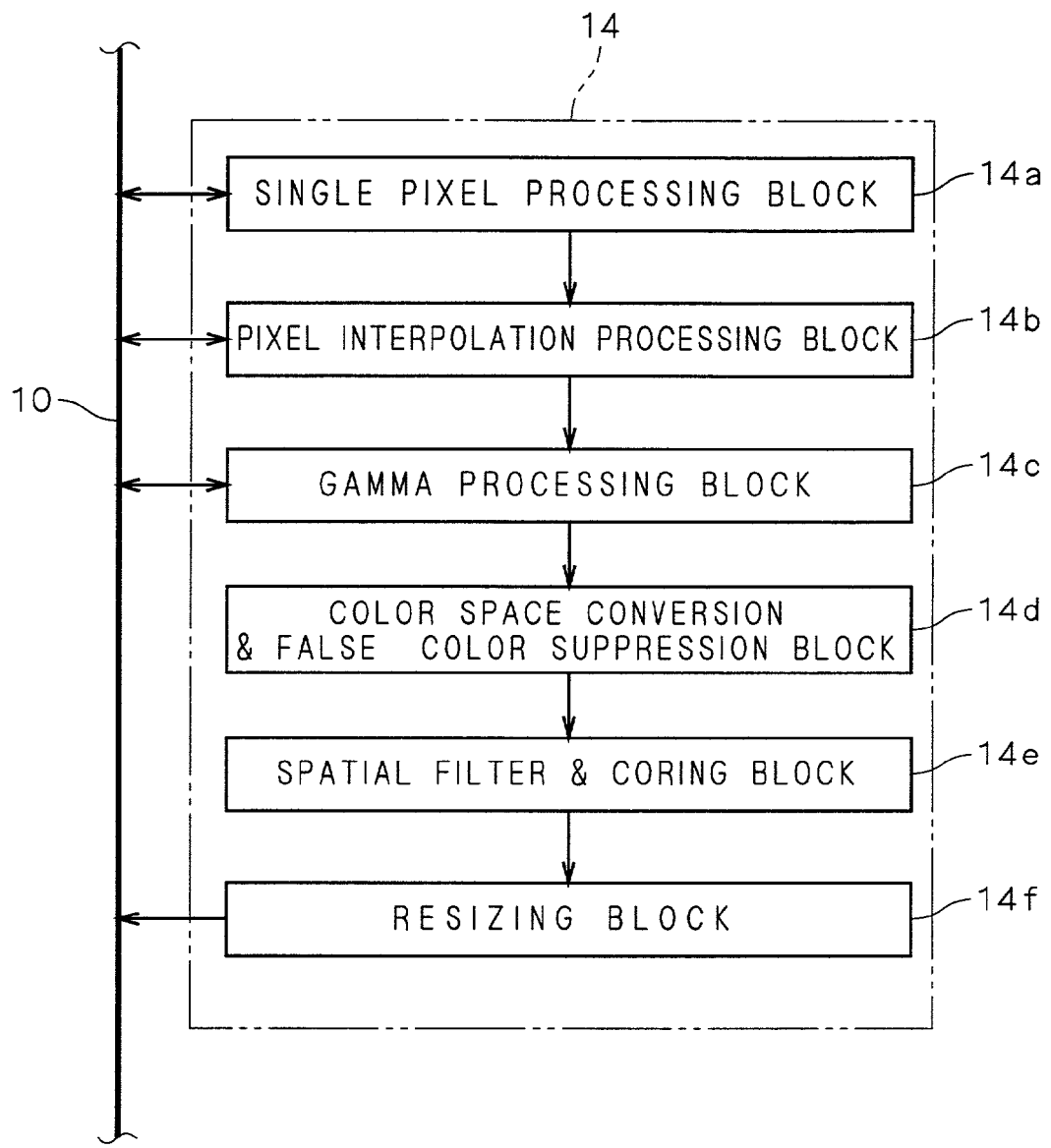
FIG. 2 schematically illustrates a functional block forming a real-time processing unit (RPU) according to the present invention.

As shown in FIG. 2, the aforementioned RPU 14 comprises a single pixel processing block 14a processing digital image signals in units of pixels, a pixel interpolation processing block 14b executing pixel interpolation described later in detail, a gamma processing block 14c correcting gamma characteristics (gamma correction), a color space conversion and false color suppression block 14d, a spatial filter and coring block 14e and a resizing block 14f resolution-converting the image data processed in these blocks 14a to 14e and outputting the same to the main bus 10. The CPU 17 executes image processing non-executable in the aforementioned RPU 14 by software. As compared with the case of executing all image processing in the CPU 17 by software, therefore, the processing speed can be improved by about several to several 10 times while the processing load on the CPU 17 is so reduced that power consumption can be reduced.

Embodiment 1

Figure 3:
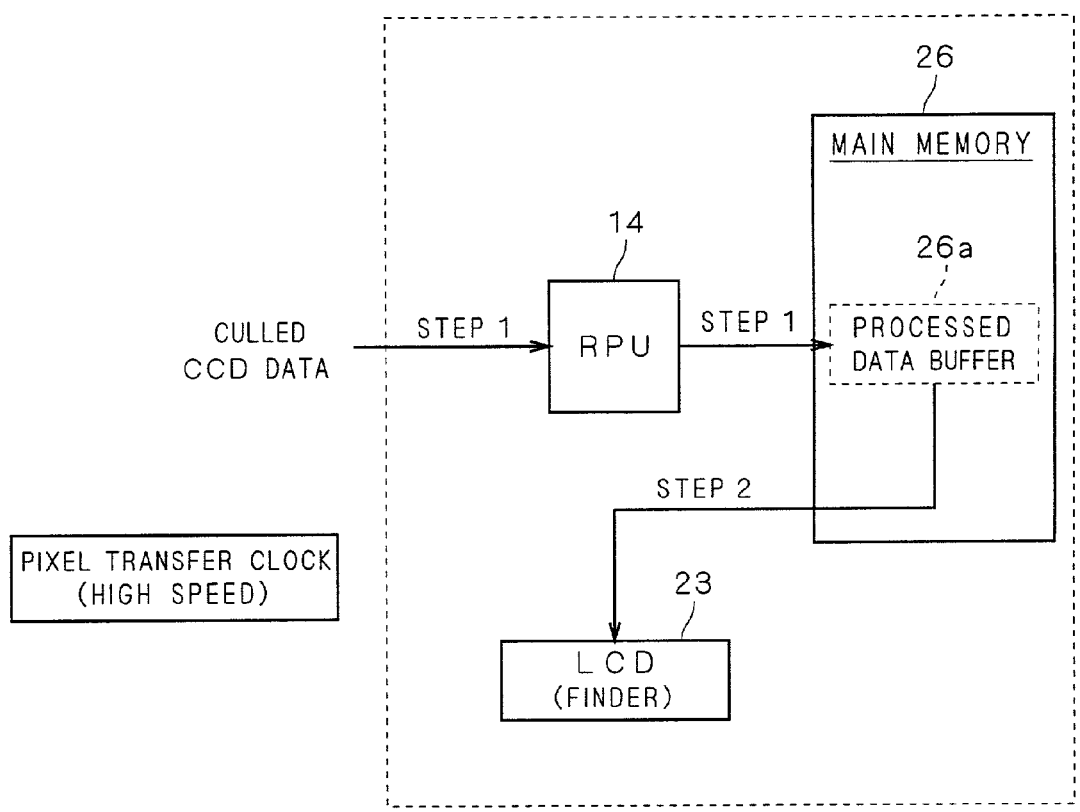
FIGS. 3 and 4 are schematic block diagrams showing flows of image signal processing according to an embodiment 1 of the present invention.
Figure 4:
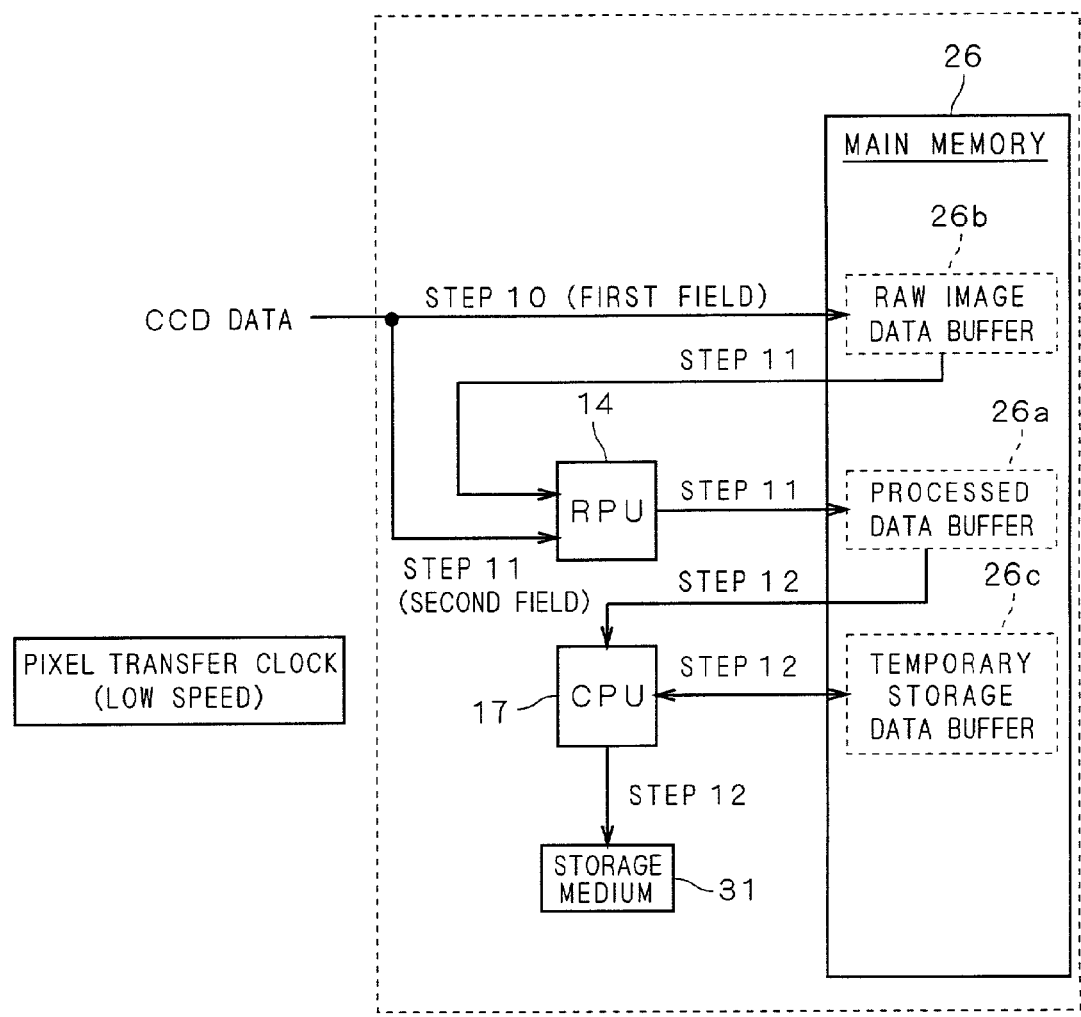
Figure 5:
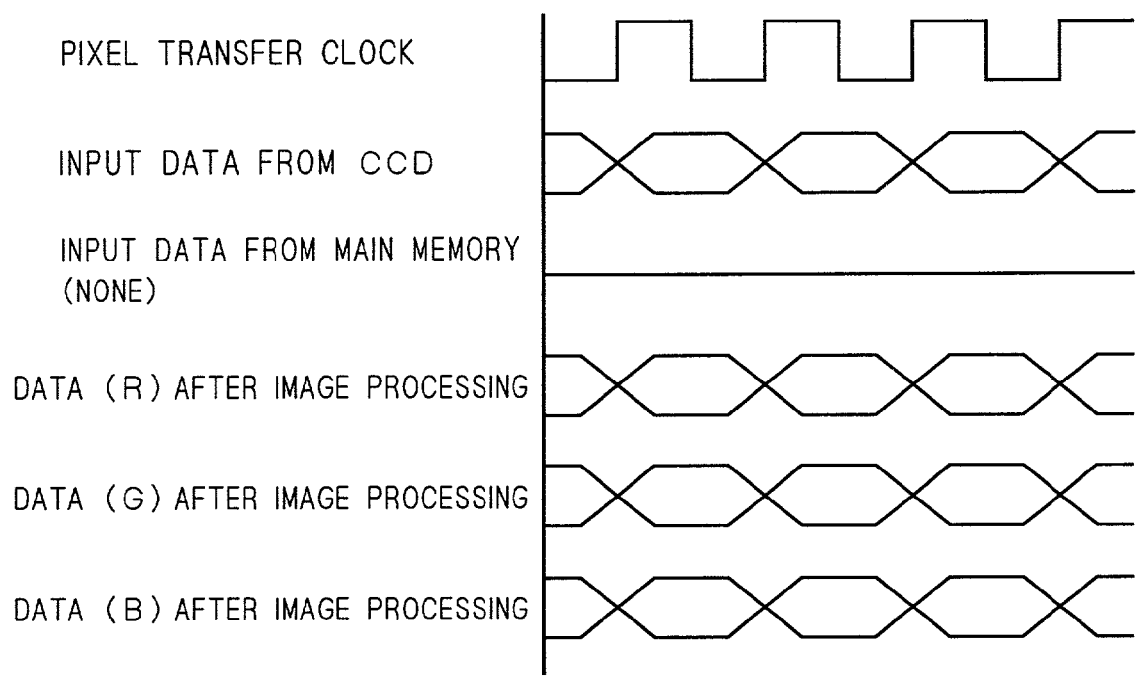
FIGS. 5 and 6 typically illustrate signal waveforms in an image processing circuit according to the embodiment 1.
Figure 6:
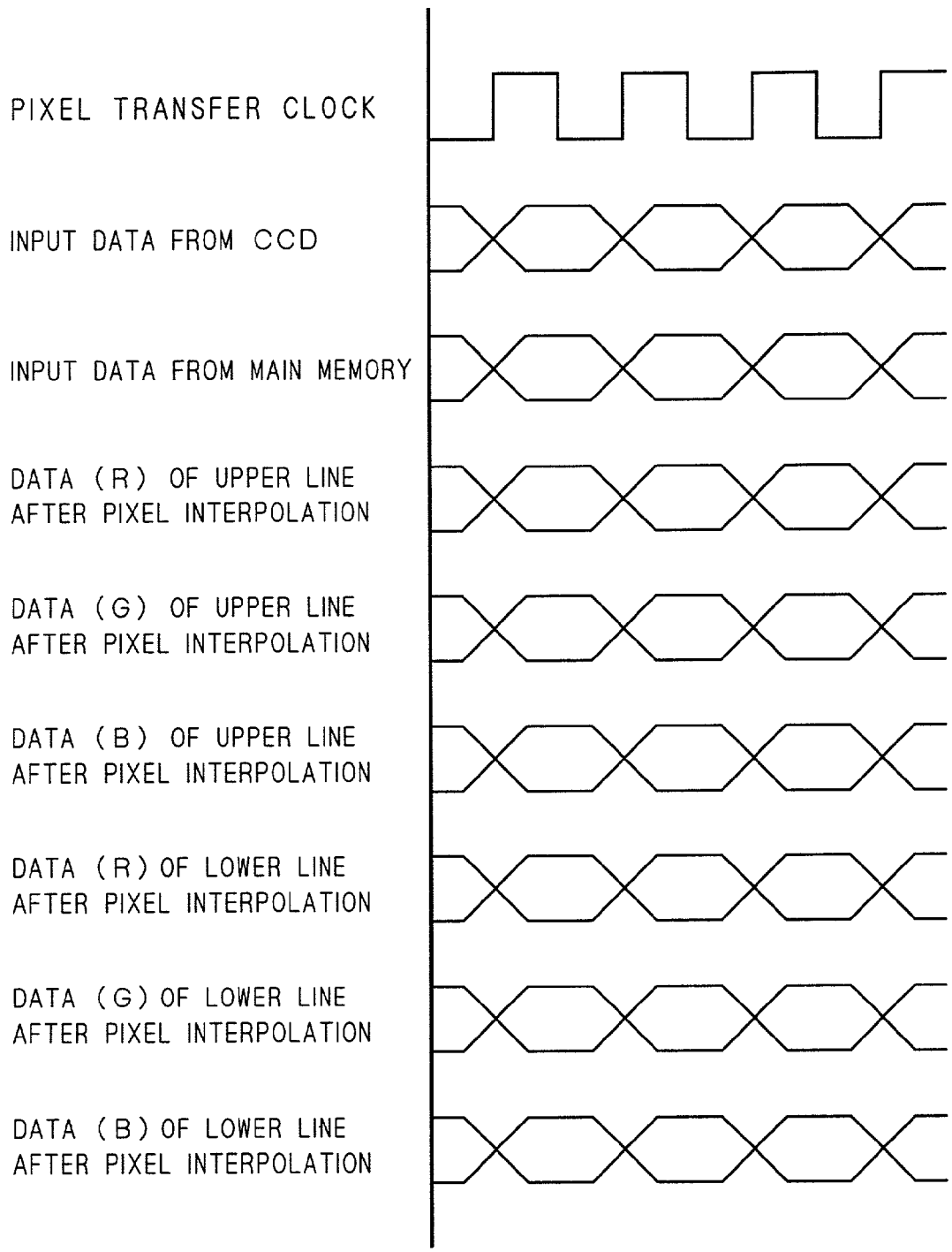

FIGS. 3 and 4 are schematic block diagrams showing the flows of image signal processing according to an embodiment 1 in the digital still camera 1 having the aforementioned structure. FIG. 3 shows the flow of image signal processing in the finder operation, and FIG. 4 shows the flow of image signal processing in the all pixel reading operation. FIG. 5 schematically illustrates signal waveforms of various data in the finder operation, and FIG. 6 illustrates signal waveforms of various data in the all pixel reading operation.

The embodiment 1 is characterized in that the frequency of a pixel transfer clock driving the CCD sensor 12 and defining the transfer rate for pixel data in the aforementioned finder operation is set to a value higher than the frequency of the pixel transfer clock in the aforementioned all pixel reading operation. In the finder operation, the CCD sensor 12 is driven by the pixel transfer clock having the signal waveform shown in FIG. 5 and controlled to output pixel data from a plurality of lines after culling prescribed horizontal lines in response to the resolution of the finder (LCD 23) as described above. As shown in FIG. 3, the CCD sensor 12 is supplied with a high-speed pixel transfer clock in the finder operation period. The culled CCD data are A/D converted in the aforementioned analog signal processing circuit 13, thereafter input in the RPU 14 and subjected to image processing such as pixel interpolation, color space conversion and edge enhancement in real time, and thereafter transferred to the main memory 26 and temporarily stored in a processed data buffer 26a (step 1). At this time, the main memory 26 inputs no data signal in the RPU 14, while the RPU 14 outputs data signals of "R (red color component)", "G (green color component)" and "B (blue color component)" after image processing shown in FIG. 5 to the main memory 26.

The image data stored in the processed data buffer 26a are read on the display module 20 through the main bus 10, and displayed on the LCD 23 functioning as the finder (step 2). The data subjected to image processing in the RPU 14 are temporarily stored in the processed data buffer 26a due to different reading rates of the CCD sensor 12 and the display module 20.

When the processing shifts to the aforementioned all pixel reading operation, the CCD sensor 12 is supplied with a low-speed pixel transfer clock as shown in FIG. 4. The CPU 17 controls the clock generator 29 to cancel the finder operation of the CCD sensor 12 and switches the pixel transfer clock frequency of the CCD sensor 12 below the maximum value of the processing clock frequency of the RPU 14 for reading all pixels from the CCD sensor 12 in the interlacing system. As shown in FIG. 4, pixel data of a first field (either an even field or an odd field) read from the CCD sensor 12 are A/D converted in the analog signal processing circuit 13, and thereafter transferred to and temporarily stored in a raw image data buffer 26b provided in the main memory 26 (step 10).

Pixel data of a second field subsequently read from the CCD sensor 12 are A/D converted in the analog signal processing circuit 13 and thereafter sequentially input in the RPU 14. At this time, the RPU 14 reads the first field temporarily stored in the aforementioned raw image data buffer 26b in synchronization with reading of the second field, and executes image processing on the pixel data of both first and second fields. The processed data are transferred to and stored in the processed data buffer 26a provided in the main memory 26 through the main bus 10 (step 11).

In the aforementioned steps 10 and 11, data transfer between the raw image data buffer 26b and the RPU 14 as well as between the RPU 14 and the processed data buffer 26a is preferably directly performed under control of the DMA controller 24 without through the CPU 17. Thus, the load on the CPU 17 can be reduced for improving the data processing speed.

Image processing in the aforementioned RPU 14 is as follows: The aforementioned single pixel processing block 14a performs multiplication and/or addition on digital image signals in units of pixels, thereby selectively performing either sequential averaging between a plurality of frames or shading correction in a single frame. Such a phenomenon that the brightness of the periphery is reduced as compared with the central position due to an optical property of a lens used in the optical mechanism 11 when an image of an object or the like is picked up with the CCD sensor 12 is generally referred to as shading. In the said shading correction, the brightness in each pixel is gain-controlled for relaxing such shading.

The pixel interpolation processing block 14b and the gamma processing block 14c can capture image data temporarily stored in the main memory 26 through the main bus 10 under control of the DMA controller 24. The image data can be directly input not only into the initial single pixel processing block 14a of the RPU 14 but also into the pixel interpolation processing block 14b and the gamma processing block 14c through the main bus 10, whereby the image data subjected to image processing in the CPU 17 can be directly input and processed in the pixel interpolation processing block 14b and the gamma processing block 14c without through the single pixel processing block 14a.

The color space conversion and false color suppression block 14d has a color space conversion function of converting image data expressed in the RGB-system three colors or the YMCG-system four colors to another color space coordinate system when an original signal is a color image signal and a false color suppression function of performing color suppression (chromatic suppression: false color prevention) on bright and dark parts of the image. A YUV coordinate system, a YIQ coordinate system or a $YC_bC_r$ coordinate system employed in the NTSC (national television system committee) system or the like may be employed for the converted coordinate system used in the color space conversion function. When the $YC_bC_r$ coordinate system is employed for color component conversion, for example, the RGB components thereof are converted to a coordinate system of $YC_bC_r$ components consisting of a luminance signal Y and two color difference signals $C_b$ and $C_r$. The correlation between the $YC_bC_r$ components is smaller than that between the RGB components, whereby the image size can be compressed.

In general, a dark part of an image is readily influenced by various noises, and hence color development is suppressed to the minimum in the dark part for outputting an image of natural picture quality. On the other hand, a bright part of the image is readily modulated in response to the characteristics of an image pickup device picking up the image of the bright part or other various hardware components to readily lose white balance, and hence color development is suppressed to the minimum for outputting an image of natural picture quality. In consideration of these facts, color development in the bright and dark parts of the image is suppressed in the aforementioned false color suppression function.

The image signals processed in the spatial filter and coring block 14e are output to the main bus 10 through the resizing block 14f, and temporarily stored in the processed data buffer 26a. Then, the processed data stored in the processed data buffer 26a are transferred to the CPU 17. The CPU 17 performs software processing such as JPEG compression on the image data transferred from the processed data buffer 26a through a temporary storage data buffer 26c provided in the main memory 26, for thereafter transferring and storing the same to and in a storage medium 31 of the external device connected through the aforementioned memory card 27 or external interface 28 (step 12).

Thus, the digital still camera 1 according to the embodiment 1 increases the frequency of the pixel transfer clock in the finder operation to about the same degree as the maximum clock frequency of the RPU 14 for setting the pixel transfer clock to a high speed while switching and setting the frequency of the pixel transfer clock to a value smaller than that in the finder operation in the all pixel reading operation. In general, the frequency of the pixel transfer clock is set to a constant value (50 MHz) within the range not exceeding the maximum clock frequency (100 MHz) of hardware such as the RPU 14 throughout the finder operation period, i.e., the culling operation period and the all pixel reading period, as illustrated in an explanatory diagram of FIG. 7. Therefore, the RPU 14 processes data read at the pixel transfer clock frequency at the processing clock frequency of 50 MHz during the finder operation period, while the pixel data are transferred to and stored in the main memory 26 and hence the processing clock of the RPU 14 is 0 MHz during the all pixel reading period and the RPU 14 processes pixel data of the first and second fields at the processing clock frequency of 100 MHz when reading the pixel data of the second field. In this case, however, the frame rate for the finder display is disadvantageously reduced, as described above.

Figure 7:
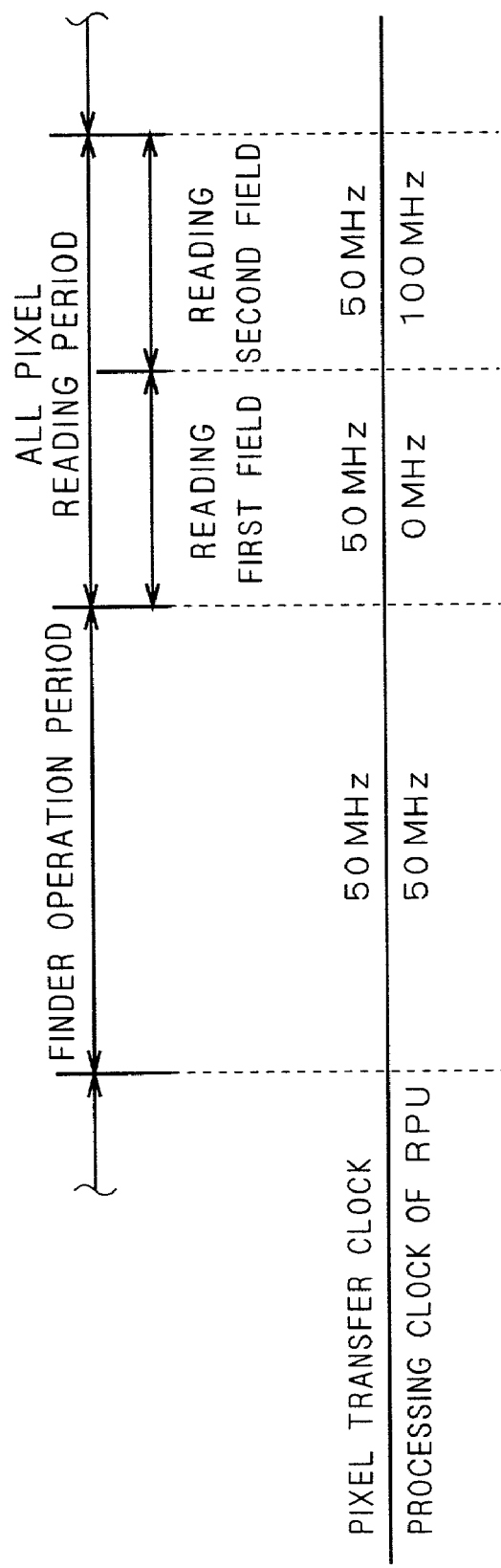
FIG. 7 illustrates pixel clock frequencies and processing clock frequencies of an RPU in a finder operation period and an all pixel reading period in a conventional image processing circuit.
Figure 8:
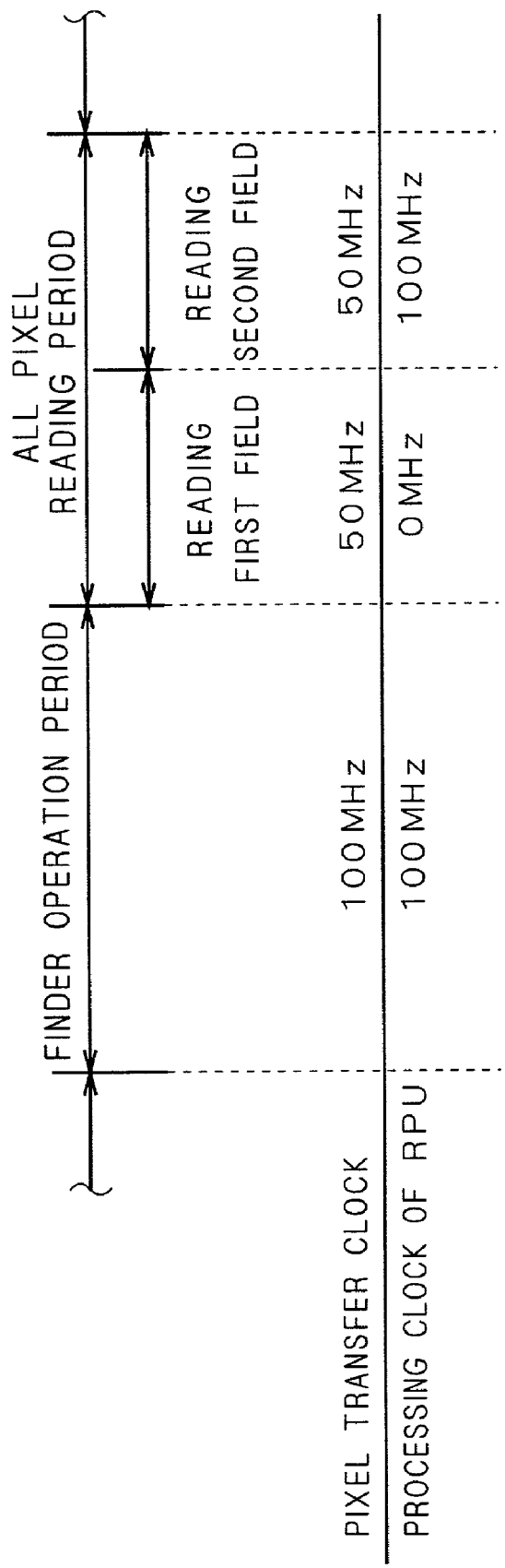
FIG. 8 illustrates pixel clock frequencies and processing clock frequencies of an RPU in a finder operation period and an all pixel reading period in the image processing circuit according to the embodiment 1.

According to the embodiment 1, on the other hand, the frequency of the pixel transfer clock in the finder operation period is set to the maximum clock frequency of 100 MHz for driving hardware such as the RPU 14 while the pixel transfer clock frequency and the processing clock frequency identical to those in the prior art shown in FIG. 7 are set in the all pixel reading period. Thus, the pixel transfer clock frequency is switched between the finder operation period and the all pixel reading period. Therefore, it is possible to set the pixel transfer clock frequency to the maximum clock frequency of the RPU 14 in the finder operation period for improving the frame rate for finder display.

The CCD sensor 12 is controlled to output the pixel data from the plurality lines after culling prescribed horizontal lines in the finder operation in the aforementioned example, and hence CCD data reduced only in vertical resolution are input in the RPU 14. In practice, it is possible to reduce horizontal resolution of CCD data before inputting the same in the RPU 14. When inputting CCD data halved in horizontal resolution in the RPU 14, for example, the processing clock frequency of the RPU 14 in the finder operation may be 50 MHz in place of 100 MHz.

embodiment 2

An embodiment 2 of the present invention is now described. While various types of color filter arrays may be arranged on pixels of a CCD sensor 12, the basic form of a Bayer primary system color filter array is prepared by alternately arranging odd lines arraying color filters in order of "R (red color component)", "G (green color component)", "R", "G", . . . and even lines arraying color filters in order of "G (green color component)", "B (blue color component)", "G", "B", . . . on respective pixels along the vertical direction as shown in FIG. 9, for example. Color components "R", "G", "G" and "B" of 2×2=4 pixels enclosed with a thick frame 33a express a set of colors. There is also a complementary (YMCG or YMCK) color filter array (not shown). In the YMCG filter array, odd lines arraying color filters in order of "C (cyan color component)", "M (magenta color component)", "C", "M", . . . and even lines arraying color filters in order of "Y (yellow color component)", "G (green color component)", "Y", "G", . . . are alternately arranged along the vertical direction.

As shown in FIG. 10, pixel data output from the CCD sensor 12 having such a color filter array are sequentially stored in respective blocks of line memories 41A, 41B, . . . , 41E provided in a pixel interpolation processing block 14b of an RPU 14 sequentially along lines. A pixel interpolation unit (not shown) is applied to pixel data of 5×5=25 pixels stored in the line memories 41A to 41E and enclosed with a thick frame 40, thereby calculating a pixel interpolation value in a central block P22. In the case of the aforementioned Bayer primary system color filter array and YMCG system color filter array, pixel data having the same color components as the pixel data stored in the block P22 among blocks P00 to P44 to which the pixel interpolation unit is applied are stored in hatched blocks P00, P02, P04, P20, P24, P40, P42 and P44. When there is a line passing through pixels corresponding to the blocks P02 and P42, for example, the average or intermediate value of the pixel data stored in the blocks P02 and P42 can be calculated and stored in the block P22 as a pixel interpolation value. Also when there are lines passing through the blocks P20 and P24, the blocks P00 and P44 and the blocks P04 and P40 respectively, pixel interpolation values can be calculated similarly to the above.

Figure 11:
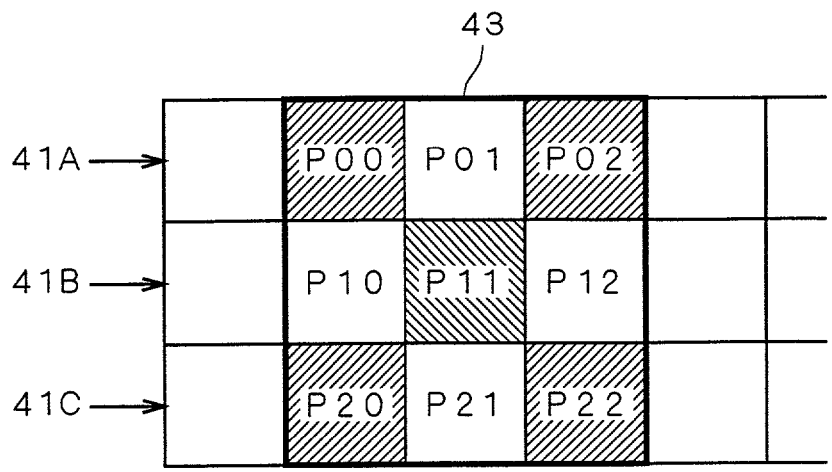
FIG. 11 illustrates other exemplary pixel interpolation units.

In place of applying the pixel interpolation unit to 5 by 5 pixels as shown in FIG. 10, three line memories 41A, 41B and 41C may be provided in the aforementioned pixel interpolation processing block 14b for applying a pixel interpolation unit (not shown) to 3×3=9 pixel data stored in blocks P00 to P22 of the line memories 41A, 41B and 41C and enclosed with a thick frame 43, as illustrated in FIG. 11. When pixel data are input in the line memories 41A to 41C from a CCD sensor having the primary system color filter array shown in FIG. 9 or the aforementioned YMCG system color filter array, pixel data stored in the four blocks P00, P02, P20 and P22 oblique to the central block P11 have the same color components. When the color component of the pixel data stored in the central block P11 is "B", for example, all color components of the pixel data stored in the oblique blocks P00, P02, P20 and P22 are "R". The average or intermediate value of the pixel data stored in the four oblique blocks P00, P02, P20 and P22 can be stored in the central block P11 as the pixel interpolation value.

In practice, a plurality of pixel interpolation units shown in FIG. 10 or 11 are built into the pixel interpolation processing block 14b, and properly selected by setting a driver circuit or driver software driving the RPU 14.

Figure 12:
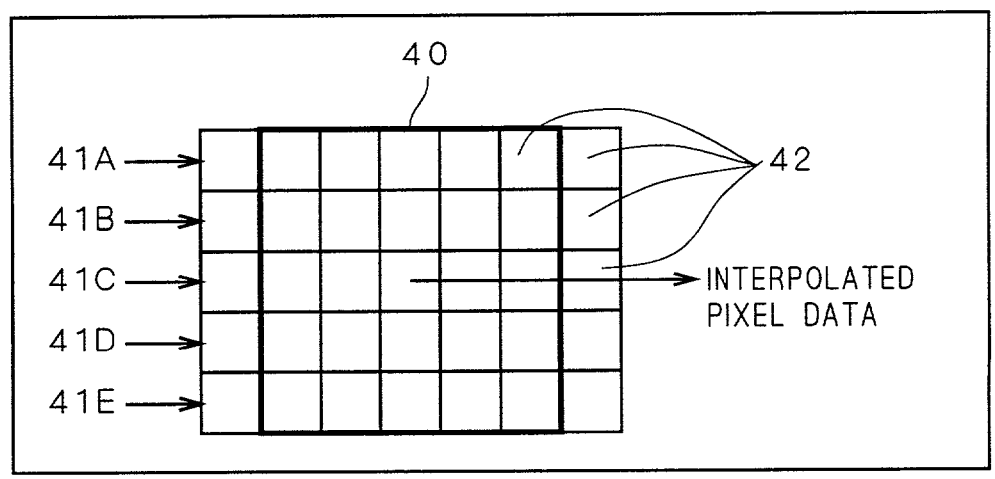
FIGS. 12, 13A and 13B are schematic diagrams for illustrating pixel interpolation processing according to an embodiment 2 of the present invention.

According to the embodiment 2, the CCD sensor 12 outputs pixel data of a plurality of lines obtained by culling prescribed horizontal lines in response to the resolution of a finder (LCD 23) in a finder operation period similar to the aforementioned one. The pixel data are sequentially stored in the line memories 41A, 41B, 41C, . . . , 41E provided in the pixel interpolation processing block 14b of the RPU 14 sequentially along lines, as illustrated in FIG. 12. The aforementioned pixel interpolation unit is applied to pixel data of 5 by 5 pixels (=25 pixels) stored in the line memories 41A to 41E, thereby calculating the interpolation value for the pixel data of the central block P11.

Figure 13A:
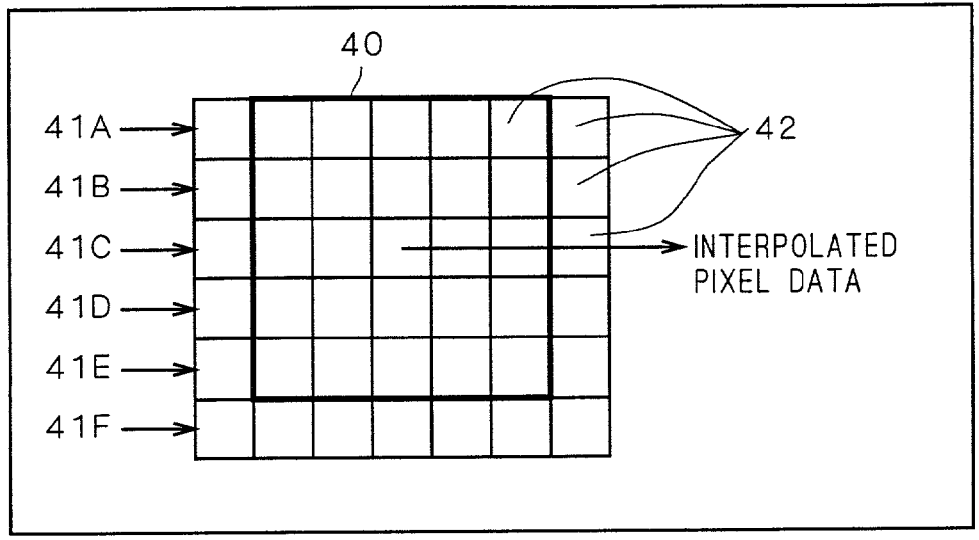

In an all pixel reading period similar to the above, on the other hand, the CCD sensor 12 outputs a first field of either an even field or an odd field similar to the above, so that this first field is temporarily stored in a raw image data buffer 26b provided in a main memory 26, as shown in FIG. 4 (step 10). Then, a second field read from the CCD sensor 12 and the first field read from the raw image data buffer 26b in synchronization with reading of the second field are temporarily stored in the line memories 41A to 41F provided in the RPU 14 as illustrated in FIG. 13A. When the illustrated line memory 41A buffers pixel data of the second field, the line memories 41C and 41E buffer precedently read pixel data of the second field while the line memories 41B, 41D and 41F buffer pixel data of the first field.

Figure 13A:
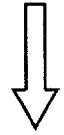
Figure 13B:
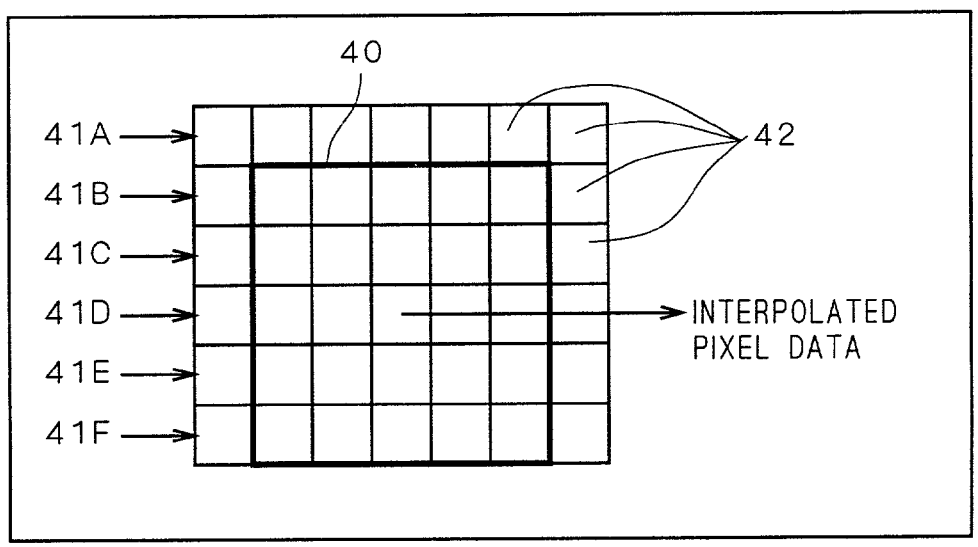

The embodiment 2 is characterized in that the pixel interpolation unit is applied to blocks of the line memories 41A to 41E enclosed with a thick frame 40 in the first half (T/2) of a single reading cycle (T) for the pixel transfer clock as shown in FIG. 13A while the pixel interpolation unit is applied to vertically displaced blocks of the line memories 41B to 41F enclosed with a thick frame 40 in the remaining half (T/2) as shown in FIG. 13B. Thus, pixel interpolation processing can be executed on the pixel data of the vertical two line memories 41C and 41D in time sharing, so that interpolation values for two pixels can be efficiently calculated in the single reading cycle (T). At this time, data signals of "R", "G" and "B" after pixel interpolation of upper and lower lines can be generated in the single reading cycle (T), as shown in FIG. 6. Thus, the pixel interpolation unit can be time-shared when the RPU 14 has a sufficiently high processing speed, whereby the circuit structure can be reduced for reducing the power and the cost for the circuit.

While the aforementioned pixel interpolation unit is applied to pixel data of 5 by 5 pixels in the embodiment 2, the aforementioned pixel interpolation unit may alternatively be applied to pixel data of 3 by 3 pixels.

When the embodiment 2 is applied to the aforementioned image processing circuit according to the embodiment 1, the pixel transfer clock is set to a high speed during the finder operation period and set to a low speed during the all pixel reading period, whereby time-sharing processing can be facilitated for efficiently performing pixel interpolation processing. In the all pixel reading operation, further, the pixel data of the first and second fields synchronously input in the RPU 14 every reading cycle of the pixel transfer clock can be collectively subjected to pixel interpolation processing every reading cycle.

embodiment 3

An image processing circuit according to an embodiment 3 of the present invention is now described. In an image processing method according to the aforementioned embodiment 2, practical effect can be readily attained when the RPU 14 has a high processing speed, while practical effect may not be attained if the RPU 14 has a low processing speed. In order to cope with the latter case, the embodiment 3 is characterized in that an RPU 14 has a plurality of pixel interpolation units for applying the pixel interpolation units to respective pixel data of a plurality of lines in one-to-one correspondence every reading cycle (T) of a pixel transfer clock for interpolating a plurality of pixels in parallel with each other. An image processing method according to the embodiment 3 is now described in detail with reference to a case of building two pixel interpolation units into the RPU 14.

Figure 14:
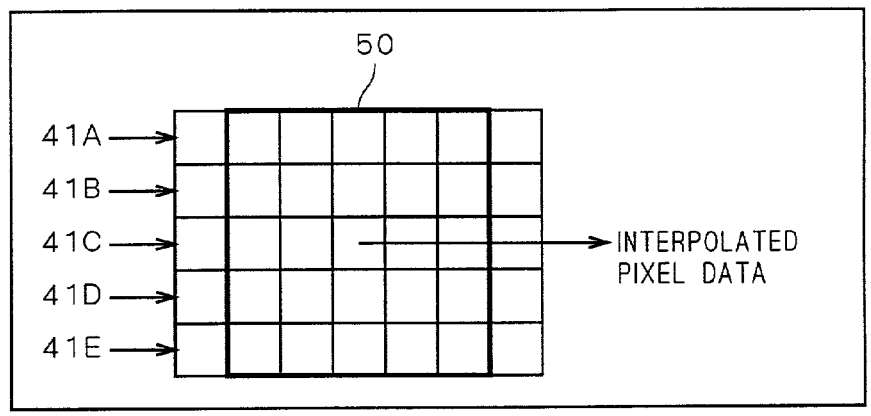
FIGS. 14 and 15 are schematic diagrams for illustrating pixel interpolation processing according to an embodiment 3 of the present invention.

In a finder operation period similar to the above, processing identical to that described with reference to FIG. 12 is executed, as illustrated in FIG. 14. The pixel interpolation units are applied to pixel data of 5 by 5 pixels stored in line memories 41A to 41E and enclosed with a thick frame 50 during a single reading cycle (T) of a pixel transfer clock, thereby calculating interpolated pixel data.

Figure 15:
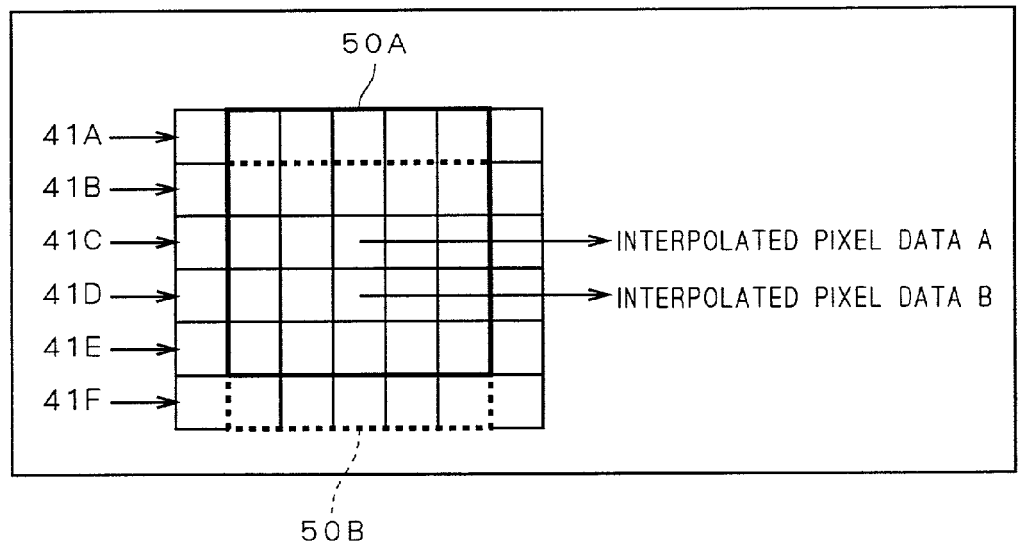

In an all pixel reading period similar to the above, the RPU 14 applies the first pixel interpolation unit to pixel data of 5 by 5 pixels stored in the line memories 41A to 41E and enclosed with a thick frame 50A and calculates interpolated pixel data A in a single reading cycle (T) of the pixel transfer clock while applying the second pixel interpolation unit to pixel data of 5 by 5 pixels stored in the line memories 41B to 41F and enclosed with a dotted line frame 50B and calculating interpolated pixel data B in parallel therewith, as illustrated in FIG. 15. Thus, pixel interpolation processing can be executed in parallel on the respective pixel data of the line memories 41C and 41D for vertical two lines during the single cycle (T) of the pixel transfer clock.

According to the embodiment 3, as hereinabove described, parallel pixel interpolation processing can be executed for the number of the pixel interpolation units built into the RPU 14 during the single reading cycle (T) of the pixel transfer clock, whereby high-speed image processing can be implemented. When the embodiment 3 is combined with the aforementioned embodiment 1, pixel data of first and second fields synchronously input in the RPU 14 every reading cycle of the pixel transfer clock can be collectively subjected to pixel interpolation processing every reading cycle in the all pixel reading operation.

As hereinabove described, the pixel interpolation processing block 14b outputs interpolation pixel data calculated in the embodiment 2 or 3 in the all pixel reading operation for two pixels every cycle (T) of the pixel transfer clock. When the pixel transfer clock employed in the pixel interpolation processing block 14b is employed in the subsequent gamma processing block 14c and the like as such, image processing such as gamma correction, color space conversion and edge enhancement must disadvantageously be performed on two pixels during one cycle of the pixel transfer clock. Image processing methods capable of solving this problem are described with reference to embodiments 4 to 6 of the present invention.

Embodiment 4

An image processing circuit according to the fourth embodiment of the present invention individually sets a pixel transfer clock frequency (F1) driving a CCD sensor 12 similar to the above and defining a transfer rate for pixel data and a pixel processing clock frequency (f2) defining a processing speed for pixel data in postprocessing blocks 14c to 14f formed by a gamma processing block 14c, a color space conversion and false color suppression block 14d, a spatial filter and coring block 14e and a resizing block 14f similar to the above. The pixel processing clock frequency (f2) is set to a value of at least twice the pixel transfer clock frequency (f1).

While the pixel processing clock used in the pixel interpolation processing block 14b may be equal to the pixel transfer clock or the pixel processing clock used in the postprocessing blocks 14c to 14f depending on the type of a CCD, it is assumed that the pixel processing clock used in the pixel interpolation block 14b is equal to the pixel transfer clock in the embodiment 4. As shown in FIG. 16, the pixel interpolation processing block 14b employs the pixel transfer clock (frequency: f1) while the postprocessing blocks 14c to 14f employ the pixel processing clock (frequency: $f2 \geq 2 \times f1$). In an all pixel reading operation similar to the above, pixel data of a first field similar to the above stored in a raw image data buffer 26b provided in a main memory 26 are DMA-transferred to an RPU 14 while pixel data of a second field similar to the above synchronized with the reading of the pixel data of the first field are read in parallel therewith and input in the RPU 14. The pixel data of the first and second fields input in the RPU 14 are processed by a single pixel processing block 14a (not shown) similar to the above and thereafter input in the pixel interpolation processing block 14b. Then, the pixel data of the first and second fields are processed by a pixel interpolation method similar to that in the aforementioned embodiment 2 or 3, so that two pixel data of two lines are output to the postprocessing blocks 14c to 14f during one cycle (1/f1) of the pixel transfer clock and the postprocessing blocks 14c to 14f execute image processing such as gamma correction during a single cycle (1/f2) of the pixel processing clock pixel by pixel. The pixel data output from the postprocessing blocks 14c to 14f are DMA-transferred to a processed data buffer 26a provided in the main memory 26.

According to the embodiment 4, as hereinabove described, the processing rates of the postprocessing blocks 14c to 14f exceed the processing rate of the pixel interpolation processing block 14b, whereby real-time image processing can be reliably executed for improving reliability of image processing.

Embodiment 5

Figure 17:
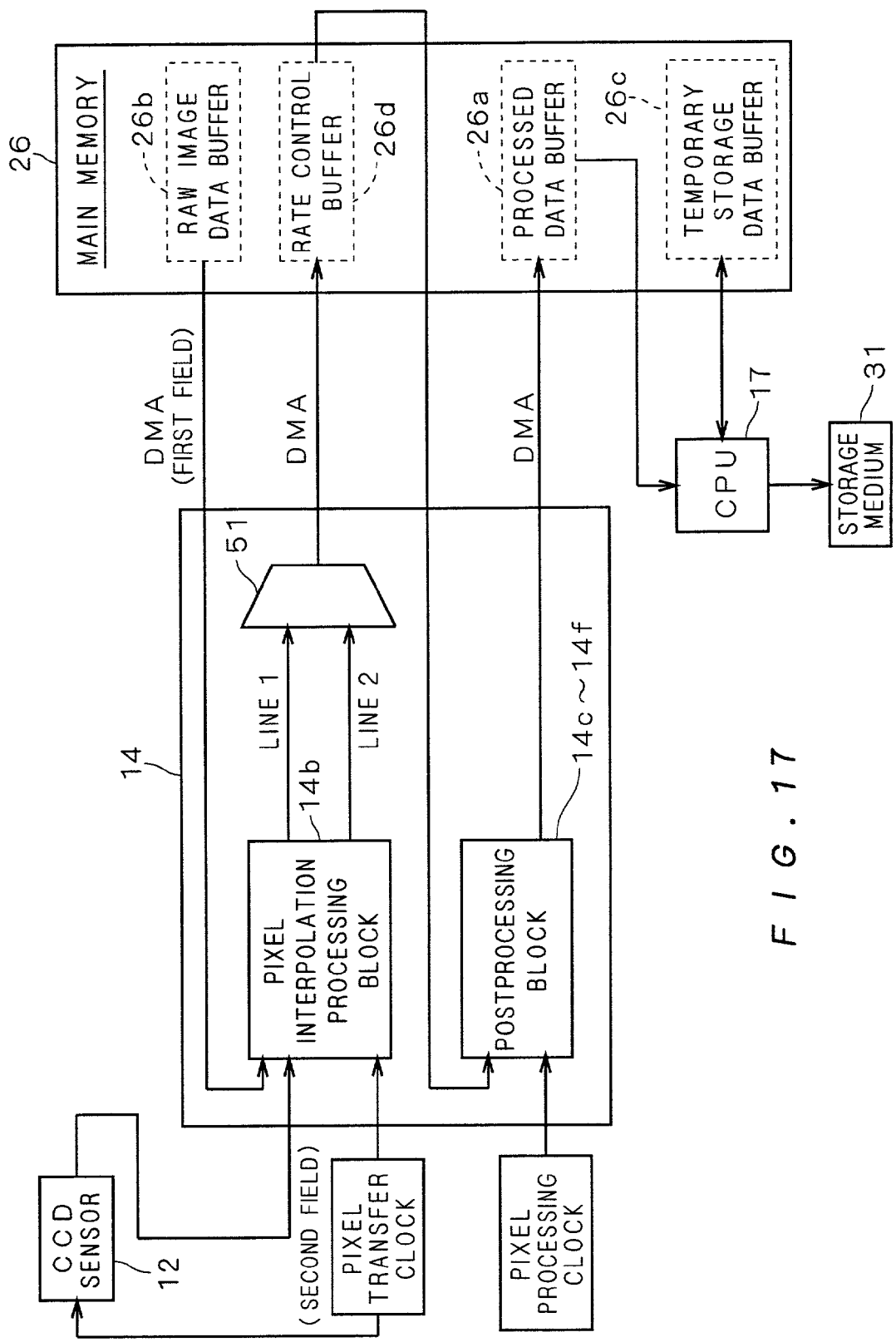
FIG. 17 schematically illustrates a flow of image signal processing according to an embodiment 5 of the present invention.

FIG. 17 is a schematic block diagram showing the flow of image signal processing according to the embodiment 5 of the present invention. Similarly to the aforementioned embodiment 4, a pixel interpolation block 14b employs a pixel transfer clock (frequency: f1) and postprocessing parts 14c to 14f employ a pixel processing clock (frequency: $f2 \geq 2 \times f1$). In an all pixel reading operation, line memories 41C and 41D output two pixel data as data of two lines in a single cycle (T) of the pixel transfer clock as shown in FIGS. 13 and 14, as described with reference to the embodiments 2 and 3.

As shown in FIG. 17, pixel data output from two lines 1 and 2 are multiplexed in a multiplexer 51 and serially rearranged to be DMA-transferred as a single output to a rate control buffer 26d provided in a main memory 26. As shown in FIG. 18, pixel data L1 and L2 stored in line memories 41K and 41L provided in a pixel interpolation processing block 14b are interpolated, thereafter multiplexed in the multiplexer 51 and DMA-transferred to the rate control buffer 26d through a FIFO (fast-in fast-out) memory (not shown), to be stored in the rate control buffer 26d in arrangement of L1, L2, L1, L2, L1, L2, . . . .

The postprocessing blocks 14c to 14f read the pixel data stored in the said rate control buffer 26d by addressing every other pixels. Thus, the postprocessing blocks 14c to 14f can read the pixel data sequentially along lines as L1, L1, . . . , L1, L2, L2, . . . , L2 for performing image processing.

Embodiment 6

Figure 19:
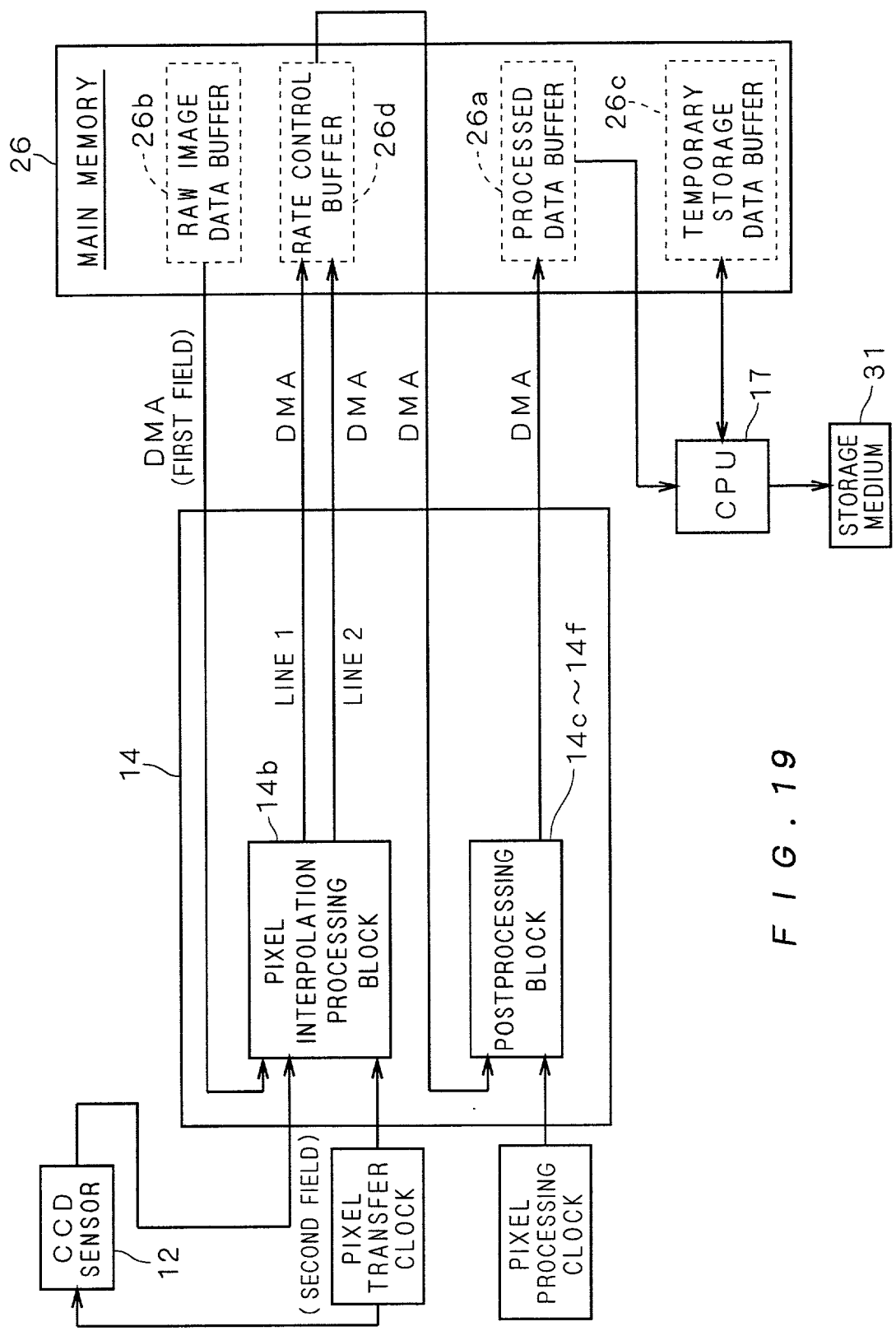
FIG. 19 schematically illustrates a flow of image signal processing according to an embodiment 6 of the present invention.

FIG. 19 schematically illustrates the flow of image signal processing according to the embodiment 6 of the present invention. Similarly to the aforementioned embodiment 4, a pixel processing clock frequency employed in postprocessing blocks 14c to 14f is set to a value of at least twice a pixel transfer clock frequency employed in a pixel interpolation processing block 14b. In all pixel reading similar to the above, pixel data of first and second fields similar to the above are input in an RPU 14 in synchronization with each other, processed in a single pixel processing block 14a (not shown) and thereafter input in the pixel interpolation processing block 14b. Two pixel data of two lines interpolated in the pixel interpolation processing block 14b in a single cycle of the pixel transfer clock are output for illustrated lines 1 and 2 respectively, and DMA-transferred to a rate control buffer 26d through a FIFO memory (not shown). Channels of a DMA controller 24 similar to the above are allocated to the respective output lines, so that the DMA controller 24 monitors and distributes a memory cycle thereby transferring and storing the pixel data to and in the rate control buffer 26d sequentially along lines. Thus, it follows that the pixel data are arranged and stored in the rate control buffer 26d sequentially along lines.

The pixel data stored in the rate control buffer 26d are sequentially read from the head, DMA-transferred to the FIFO memory (not shown) and thereafter output to the postprocessing blocks 14c to 14f. The postprocessing blocks 14c to 14f execute color space conversion, edge enhancement etc. on the input pixel data, and thereafter DMA-transfers the processed data to a processed data buffer 26a provided in a main memory 26.

Thus, the embodiment 6 rearranges the pixel data output from the pixel interpolation processing block 14b sequentially along lines under channel control of the DMA controller 24 and stores the same in the rate control buffer 26d, whereby the postprocessing blocks 14c to 14f can execute a series of image processing sequentially along lines.

Embodiment 7

Figure 20:
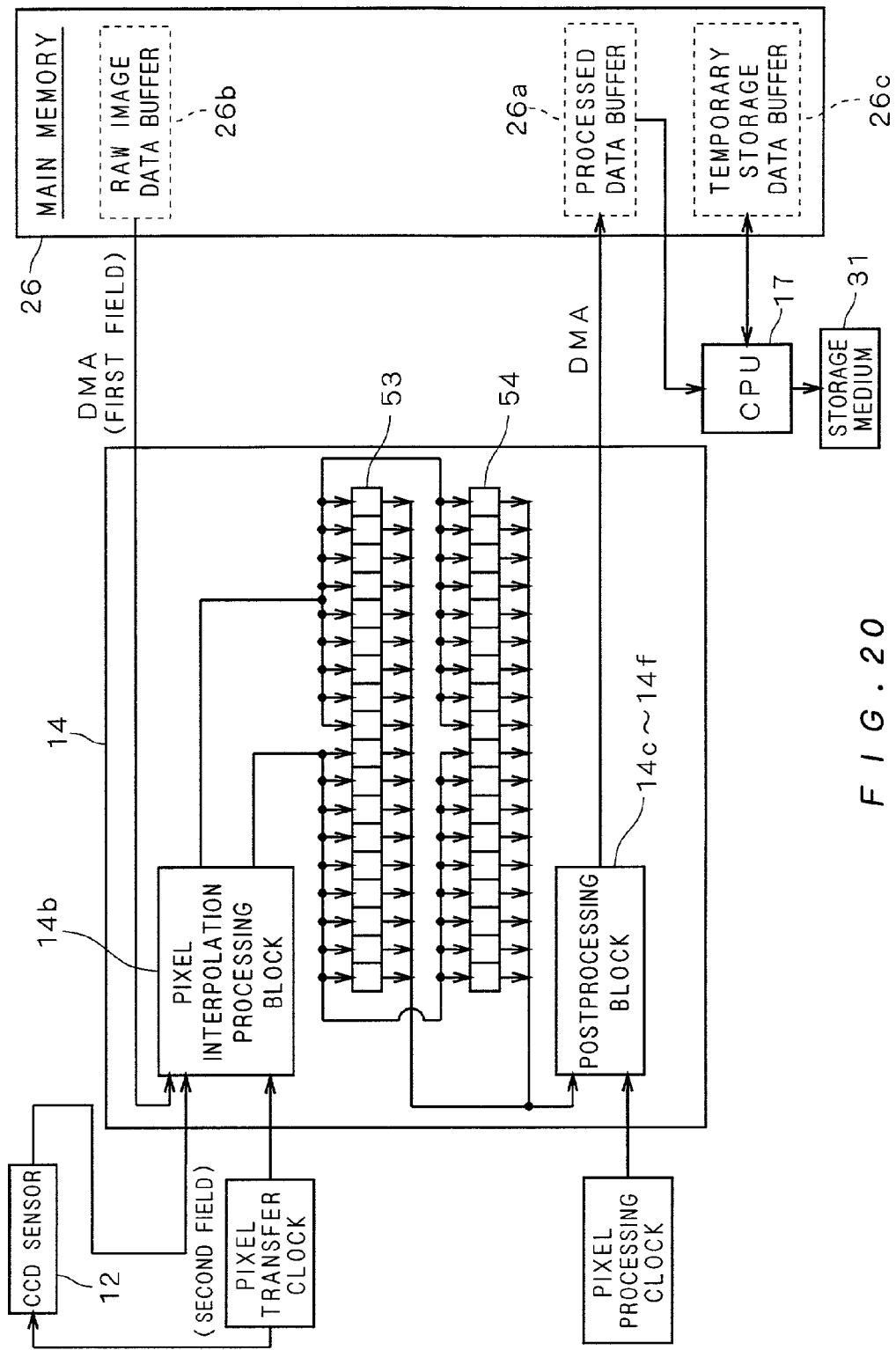
FIG. 20 schematically illustrates a flow of image signal processing according to an embodiment 7 of the present invention.

FIG. 20 schematically illustrates the flow of image signal processing according to the embodiment 7 of the present invention. Similarly to the aforementioned embodiment 4, a pixel processing clock frequency employed in postprocessing blocks 14c to 14f is set to a value of at least twice a pixel transfer clock frequency employed in a pixel interpolation processing block 14b. In all pixel reading period similar to the above, pixel data of first and second fields similar to the above are input in an RPU 14 in synchronization with each other, processed in a single pixel processing block 14a (not shown) and thereafter input in the pixel interpolation processing block 14b.

Pixel data of two lines interpolated in the pixel interpolation processing block 14b are output for illustrated lines 1 and 2 respectively, and written in a first line memory 53 built into the RPU 14 every line. The pixel data of two lines stored in the first line memory 53 are read every line at a speed twice the writing speed for the first line memory 53, input in postprocessing blocks 14c to 14f sequentially along lines and subjected to image processing such as gamma correction, color space conversion etc. In parallel with this reading of the pixel data from the first line memory 53, a second line memory 54 stores pixel data of new two lines subjected to pixel interpolation.

After the pixel data stored in the first line memory 53 are read and the second line memory 54 stores the pixel data of the new two lines, the pixel data of the second line memory 54 are read every line at the speed twice the writing speed for the first line memory 53, input in the postprocessing blocks 14c to 14f sequentially along lines and subjected to image processing such as gamma processing. The first line memory 53 stores pixel data of new two lines subjected to pixel interpolation in parallel therewith. The pixel data subjected to image processing in the postprocessing blocks 14c to 14f are DMA-transferred to a processed data buffer 26a provided in a main memory 26.

While the embodiment 7 employs two single-port memories 53 and 54 capable of storing pixel data of two lines, dual-port memories capable of storing pixel data of four lines may alternatively be employed.

Thus, the embodiment 7 can rearrange pixel data output from the pixel interpolation processing block 14b in the RPU 14 sequentially along lines and output the same to the postprocessing blocks 14c to 14f.

Modification of any of Embodiments 4 to 7

Figure 21:
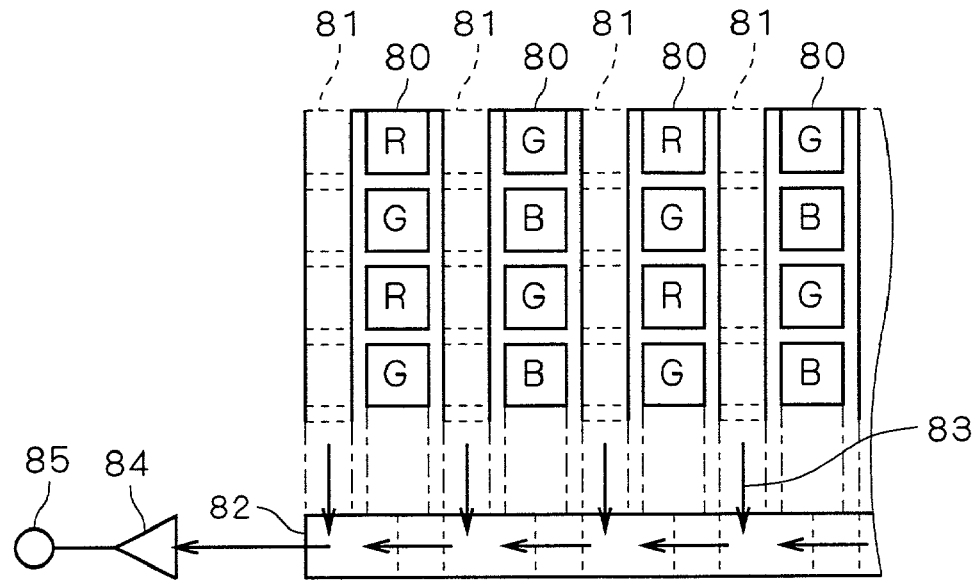
FIG. 21 schematically illustrates an exemplary CCD structure outputting pixel data of a single line.

The image processing circuit according to any of the aforementioned embodiments 4 to 7 can be applied to a CCD sensor outputting two pixel data during a single cycle of the aforementioned pixel transfer clock. While the CCD sensor 12 employed in any of the aforementioned embodiments fetches single pixel data from one line during one cycle of the pixel transfer clock, there also exists a CCD sensor fetching two pixel data from two lines respectively during one cycle of the pixel transfer clock for improving the reading speed mainly as a progressive CCD sensor. FIG. 21 schematically illustrates the structure (structure of an interline transfer CCD) of the CCD sensor 12 employed in any of the aforementioned embodiments. As shown in FIG. 21, vertical transfer CCDs 81 are arranged between respective columns of charge storage parts 80 formed by linearly arranging a plurality of photodiodes, and a single horizontal transfer CCD 82 is provided adjacently to the vertical transfer CCDs 81 of the final row. Referring to FIGS. 21, symbols "R", "G" and "B" of color components are assigned to respective pixels forming the charge storage parts 80. Charges stored in the photodiodes of the charge storage parts 80 are transferred to the vertical transfer CCDs 81 every horizontal line, and the vertical transfer CCDs 81 transfer signal charges in parallel along a vertical transfer direction 83. Every time a signal for one line is input, the horizontal transfer CCD 82 horizontally transfers the signal and outputs the same from a single signal output terminal 85 through an output circuit (sense amplifier) 84.

Figure 22:
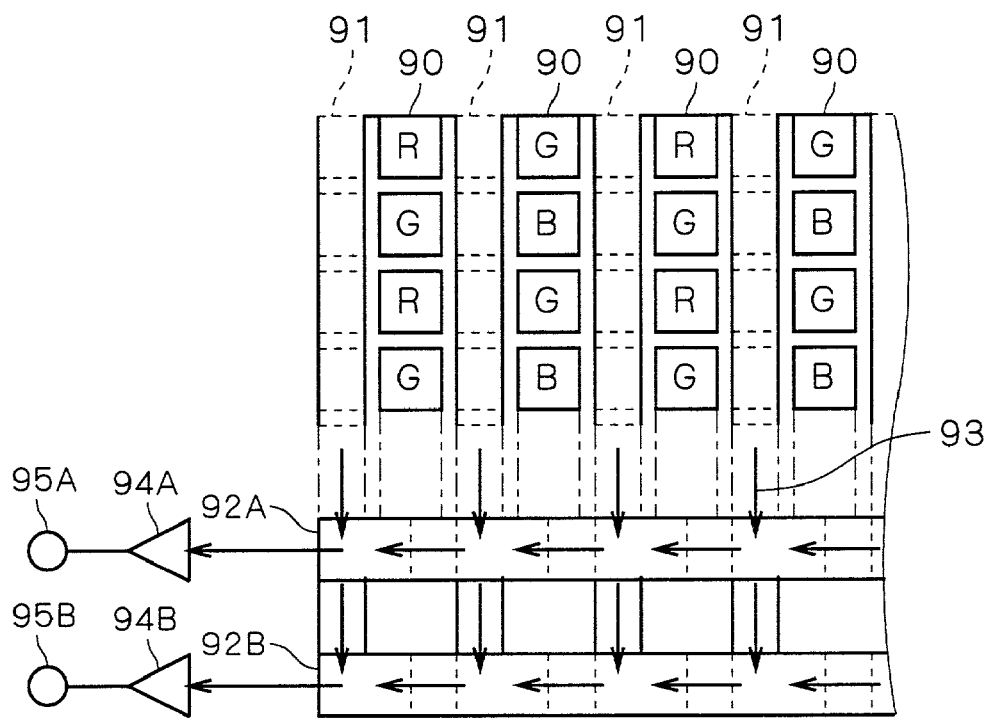
FIG. 22 schematically illustrates an exemplary CCD structure outputting pixel data of two lines.

FIG. 22 schematically illustrates a CCD structure outputting pixel data of two lines during one cycle of a pixel transfer clock. Referring to FIG. 22, numeral 90 denotes charge storage parts, numeral 91 denotes vertical transfer CCDs arranged between respective columns of the charge storage parts 90, and numerals 92A and 92B denote horizontal transfer CCDs. Charges stored in respective photodiodes of the charge storage parts 90 are transferred to the vertical transfer CCDs 91 and thereafter transferred in parallel along a vertical transfer direction 93 every two horizontal lines. Signals of two lines are simultaneously horizontally transferred by the first and second horizontal CCDs 92A and 92B respectively, and output from signal output terminals 95A and 95B through output circuits (sense amplifiers) 94A and 94B. Thus, pixel data of two lines are output in a single cycle of the pixel transfer clock, and hence the pixel data can be read at a double speed as compared with the CCD structure shown in FIG. 21.

According to a modification 1, the pixel data of two lines shown in FIG. 22 are input in the pixel interpolation processing block 14b of the RPU 14 in the aforementioned embodiment 4 in place of the pixel data of the aforementioned first and second fields. Further, the pixel processing clock frequency (f2) employed in the aforementioned post-processing blocks 14c to 14f is set to a value of at least twice the pixel transfer clock frequency (f1) driving the CCD sensor having the structure shown in FIG. 22. Thus, the processing rates of the postprocessing blocks 14c to 14f can exceed the processing rate of the pixel interpolation processing block 14b so that real-time image processing can be efficiently performed.

It is desirable to replace the input data in the pixel interpolation processing block 14b with the pixel data of two lines shown in FIG. 22 for employing any of the structures according to the aforementioned embodiments 5 to 7. Thus, interpolated pixel data of two lines output from the pixel interpolation processing block 14b can be converted sequentially along lines and subjected to postprocessing.

Modification 2 of any of Embodiments 4 to 7

Figure 23:
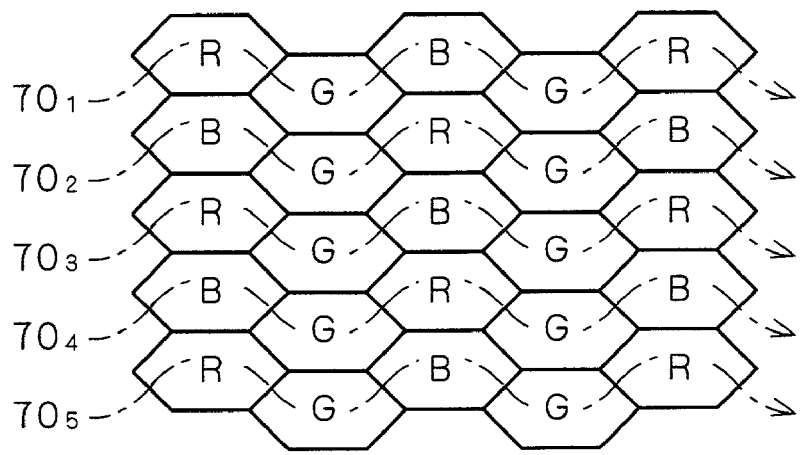
FIG. 23 is a schematic diagram for illustrating a honeycomb pixel arrangement.
Figure 24:
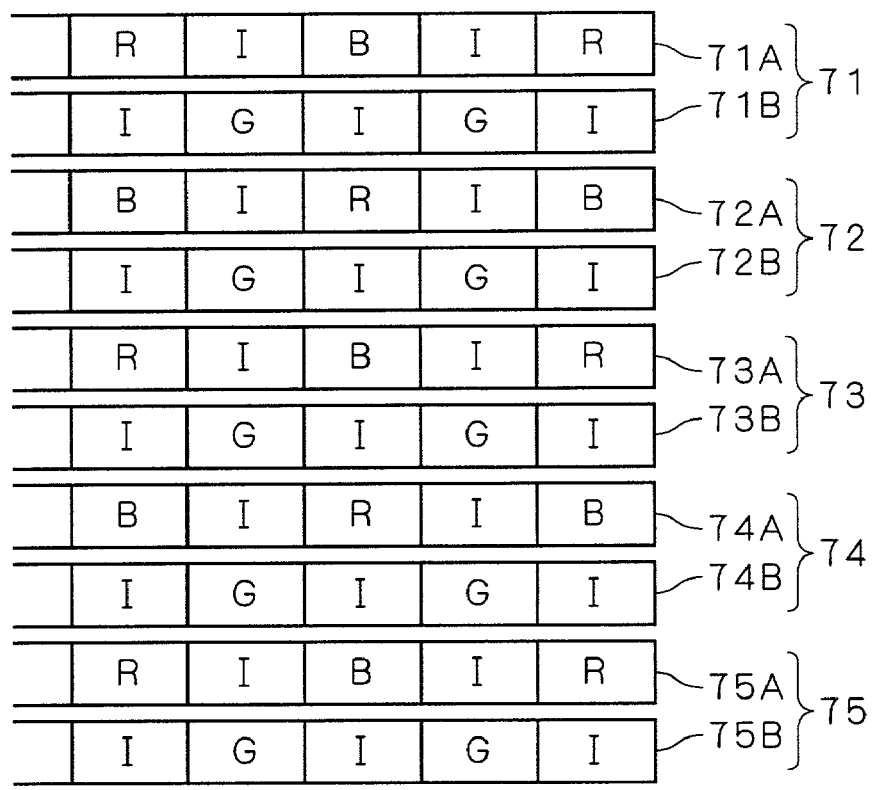
FIG. 24 is a typical diagram showing a line memory group storing pixel data read from an image pickup element having the pixel arrangement shown in FIG. 23.

The image processing circuit according to any of the aforementioned embodiments 4 to 7 can be applied to an image pickup device having honeycomb pixel arrangement described below. FIG. 23 is a schematic diagram for illustrating the honeycomb pixel arrangement. Referring to FIG. 23, symbols "R", "G" and "B" denote color filters on respective unit pixel cells. Pixel data of lines along phantom lines $70_1$ to $70_5$ are read from the image pickup device. The pixel data of these lines are further decomposed into those of the color component "G" and those of other color components, and stored in line memories (registers) as shown in FIG. 24. While the pixel data of the line along the phantom line $70_1$ shown in FIG. 24 are stored in line memory sets 71 shown in FIG. 24, the pixel data of the color components "R" "B", "R", . . . are stored in line memories 71A every other pixel. Symbol "I" denotes blocks storing no pixel data. The pixel data of the color component "G" are stored in line memories 71B every other pixel to be vertically adjacent to the blocks I on the line memories 71A. The pixel data on the lines along the remaining phantom lines $70_2$ to $70_5$ shown in FIG. 23 are also stored in line memory sets 72 to 75 shown in FIG. 24 similarly to those of the line along the phantom line $70_1$.

Figure 25A:
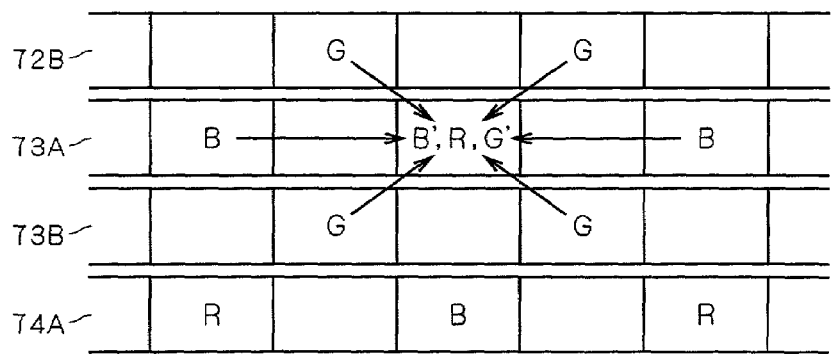
FIGS. 25A, 25B and 25C are explanatory diagram showing exemplary pixel interpolation methods.
Figure 25B:
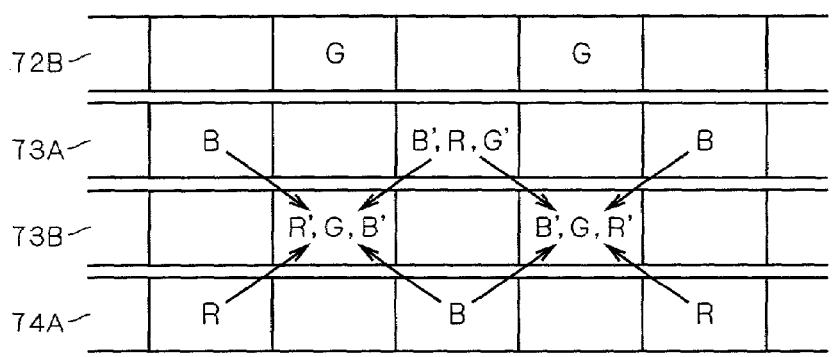
Figure 25C:
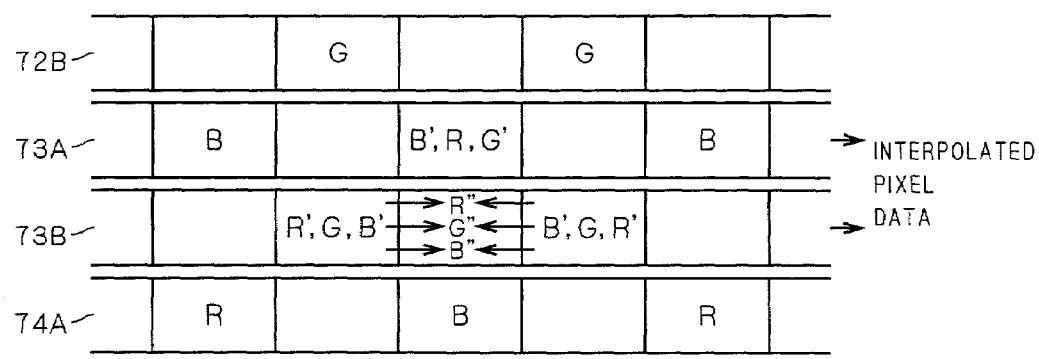
Figure 26:
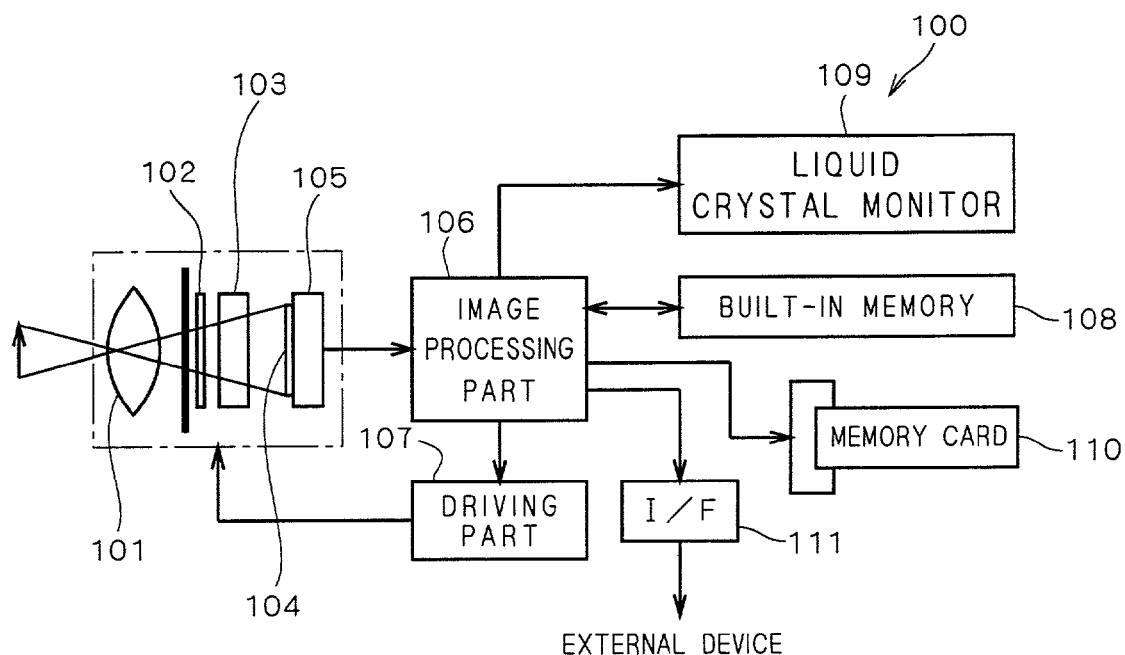
FIG. 26 is a block diagram schematically showing the structure of a general digital still camera.
Figure 27:
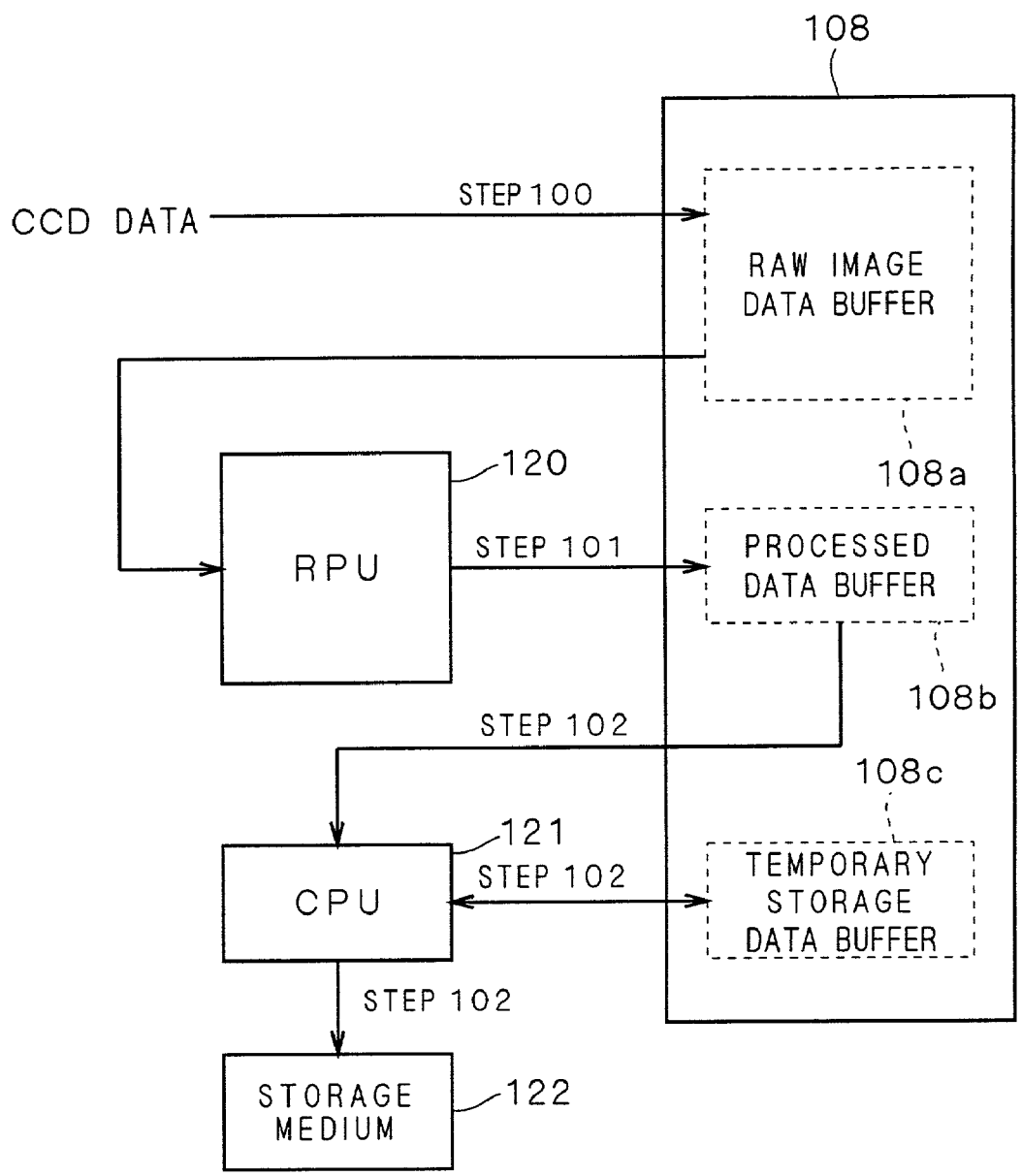
FIG. 27 schematically illustrates an exemplary flow of conventional image signal processing.

Pixel interpolation processing is executed on the pixel data stored in such a mode every two lines during a cycle of a pixel transfer clock. Exemplary pixel interpolation is now described with reference to FIGS. 25A to 25C. First, the average or intermediate value of the component "B" on both horizontal sides is interpolated as "B' (blue color component)" as to the blocks of the component "R" in the line memory 73A, and the average or intermediate value of the component "G" in the four line memories 72B and 73B oblique to the component "R" is interpolated as "G' (green color component)", as shown in FIG. 25A. Then, the average or intermediate values of the same color components "B" and "R" in the memories 73A and 74A are interpolated as "R' (red color component)" and "B' (blue color component)" as to the blocks of the component "G" of the line memory 73B, as shown in FIG. 25B. The average or intermediate values of the color components interpolated in FIG. 25B are calculated as shown in FIG. 25C, thereby interpolating "R" (red color component)", "G" (green color component)" and "B" (blue color component)" of the blocks storing no pixel data. Two line memories output two interpolated pixel data respectively during one cycle of the pixel transfer clock due to this pixel interpolation.

When the pixel transfer clock employed for pixel interpolation with respect to the image pickup device of the honeycomb pixel arrangement is applied to subsequent image processing (gamma correction, color space conversion, false color suppression etc.) as such, therefore, this results in the aforementioned problem such that two interpolated pixel data of two lines must be simultaneously processed during a single cycle of the pixel transfer clock. In order to solve this problem, pixel data of two lines output from the aforementioned image pickup device of the honeycomb pixel arrangement can be input in the pixel interpolation processing block 14b of the RPU 14 in the aforementioned embodiment 4 in place of the aforementioned pixel data of the first and second fields for setting the pixel processing clock frequency (f2) employed in the aforementioned postprocessing blocks 14c to 14f to a value of at least twice the pixel transfer clock frequency (f1) driving the image pickup device of the honeycomb pixel arrangement. Thus, image processing can be performed on the pixel data output from the image pickup device of the honeycomb pixel arrangement in the postprocessing blocks 14c to 14f at a speed capable of coping with the processing rate of the pixel interpolation processing block 14b. Further, any of the structures according to the aforementioned embodiments 5 to 7 is preferably employed in order to convert and post-process interpolated pixel data output in two lines sequentially along lines.

While the invention has been shown and described in detail, the foregoing description is in all aspects illustrative and not restrictive. It is therefore understood that numerous modifications and variations can be devised without departing from the scope of the invention.

What is claimed is:

1. An image processing circuit comprising:
   an image pickup sensor configured to be driven by an interlacing system of reading image signals from an odd field and an even field at temporally different timings, said odd field consisting of only odd lines of an image and said even field consisting of only even lines of said image;
   a buffer part configured to store pixel data of a first field, said first field being defined to be only one of said odd field or said even field; and
   an image processing part configured to read pixel data from said first field stored in said buffer part in synchronization with reading pixel data of a second field said second field being an even field if the first field is an odd field or an odd field if the first field is an even field and to simultaneously process said pixel data of both said first and second fields in real time, wherein
   said image processing part includes a pixel interpolation unit configured to sequentially interpolate pixel data, of a plurality of lines of said image during respective fractions of a same single reading cycle of a pixel transfer clock configured to drive said image pickup sensor.

2. An image processing circuit comprising:
   an image pickup sensor configured to be driven by an interlacing system of reading image signals from an odd field and an even field at temporally different timings, said odd field consisting of only odd lines of an image and said even field consisting of only even lines of said image;

a buffer part configured to store pixel data of a first field, said first field being defined to be only one of said odd field or said even field; and an image processing part configured to read pixel data from said first field stored in said buffer part in synchronization with reading pixel data of a second field said second field being an even field if the first field is an odd field or an odd field if the first field is an even field and to simultaneously process said pixel data of both said first and second fields in real time, wherein said image processing part includes a plurality of pixel interpolation units configured to concurrently interpolate pixel data, of a plurality of lines of said image, via a one-to-one correspondence between said plurality of lines and said plurality of pixel interpolation units, during a same single reading cycle of a pixel transfer clock configured to drive said image pickup sensor.

* * * * *